United States Patent [19]
Cyman et al.

[11] Patent Number: 5,828,814
[45] Date of Patent: Oct. 27, 1998

[54] REDUCED COST HIGH RESOLUTION REAL TIME RASTER IMAGE PROCESSING SYSTEM AND METHOD

[75] Inventors: Theodore F. Cyman; Kevin P. Kernin, both of Grand Island; Robert J. Recchione, Niagara Falls; Anthony L. Treis, North Tonawanda, all of N.Y.

[73] Assignee: Moore Business Forms, Inc., Grand Island, N.Y.

[21] Appl. No.: 709,848

[22] Filed: Sep. 10, 1996

[51] Int. Cl.$^6$ .................................................. G06K 15/00
[52] U.S. Cl. ............................................ 395/102; 395/112
[58] Field of Search ..................................... 395/110, 112, 395/114, 115, 116, 833, 834, 882, 884, 892; 400/61, 62, 67, 76; 358/442, 444

[56] References Cited

U.S. PATENT DOCUMENTS

| | | |
|---|---|---|
| 5,003,496 | 3/1991 | Hunt, Jr. et al. . |
| 5,109,476 | 4/1992 | Thompson . |
| 5,113,494 | 5/1992 | Menendez et al. ..................... 395/163 |
| 5,146,554 | 9/1992 | Statt . |
| 5,506,941 | 4/1996 | Kurumida . |
| 5,528,374 | 6/1996 | Matias . |
| 5,572,631 | 11/1996 | Kavathekar et al. .................... 395/115 |
| 5,572,632 | 11/1996 | Laumeyer et al. . |

FOREIGN PATENT DOCUMENTS

| | | |
|---|---|---|
| 470782 | 2/1992 | European Pat. Off. . |
| 597571 | 5/1994 | European Pat. Off. . |
| WO 95/28685 | 10/1995 | WIPO . |
| WO 96/19352 | 6/1996 | WIPO . |

OTHER PUBLICATIONS

Alexander et al., "Output Devices: Faster RIPs and Recorders," *Seybold Report on Publishing Systems,* V.22, n.16, May 19, 1993.

*Primary Examiner*—Arthur G. Evans
*Attorney, Agent, or Firm*—Nixon & Vanderhye P.C.

[57] ABSTRACT

A reduced cost, scaled down raster image processor (RIP) provides fast real time imaging without the cost and complexity of prior designs. The scaled down RIP can be tailored to accommodate image generation in a particular printing range to efficiently run print bars at a reduced equipment cost. The scaled down RIP utilized a personality module in conjunction with a scaled down controller to provide limited print information to a print engine. The personality module tailors the system for a particular print engine, such as a Moore® Independent Cartridge Array (MICA) ink jet printer. The personality module is responsible for requesting and reading raster data to build up the staging RAM. A pair of EEPROMs may be used to control each bar read according to the position and distance from the other. Pixel data is then sent to the service station along with the print bar address. The personality module outputs the sequence of pixel data to the service station for imaging, interfaces the display and keyboard information, and transfers the various offsets to a control ASIC for rehandling the pixel data at the staging RAM.

19 Claims, 23 Drawing Sheets

RISC SOFTWARE FUNCTIONAL BREAKDOWN

REDUCED COST HIGH RESOLUTION REAL TIME RASTER IMAGE PROCESSING SYSTEM AND METHOD

CROSS REFERENCE TO RELATED APPLICATION

This application is related to commonly owned co-pending U.S. patent application Ser. No. 08/500,011 filed Jul. 10, 1995 by Theodore F. Cyman et al. The aforementioned co-pending application is hereby incorporated by reference in its entirety.

FIELD OF THE INVENTION

This invention relates to high speed, high resolution intelligent electronic imaging, and more particularly to high speed electronic plateless printing. More particularly, the present invention relates to Raster Image Processors ("RIPs") for rapidly generating images. Still more particularly, the present invention relates to scaled down, reduced cost high speed dedicated Raster Image Processor Systems for real time generation of high resolution images including various different types of image objects.

BACKGROUND AND BRIEF SUMMARY OF THE INVENTION

Modern high speed electronic "plateless" printing engines have capabilities not even dreamed of only a few years ago. For example, the current line of MIDAX® printing engines available from Moore Business Forms, Inc. of Lake Forest, Ill. can print high resolution images on a continuous "web" of paper moving at a speed on the order of 500 feet per minute. High speed, high resolution color printing engines are also now available that can print very high resolution (e.g., 600 dpi) color images on continuous or sheet-fed paper moving at speeds of on the order of 300 feet per minute or more.

To provide maximum image flexibility, high performance "intelligent" electronic printing engines generally take as an input, data defining a digital value for each printable location on the printed page. Such locations are commonly referred to as "pixels" (short for "picture elements"). Although pixel-based intelligent electronic printing engines can print virtually any arbitrary image (within the resolution, color and other limitations of the print engine), they require a massive amount of input data for high resolution printing. For example, to print an 8-½ inch by 11-inch page at a 600 dots-per-inch resolution requires 5100×6600 =33.66 million individual pixel values. High speed printers can print on the order of 300 to 500 pages per minute (i.e., on the order of 8 pages or more per second)—and therefore require in the excess of 300 million pixels (120,000 characters) per second. The digital value associated with each pixel may nominally be only one digital "bit" (if the "bit" is "on" the printer should place ink at the corresponding location; if the "bit" is "off" the printer should not place ink at that location). However, modern electronic printing engines provide multiple (e.g., 4) bits for each pixel to encode gray scale level or one of several different colors. This requires a data delivery system that can provide on the order of 1.2 billion digital bits per second.

General purpose digital computers of reasonable cost and complexity are not capable of supplying print stream data at these incredible rates. The alternative to real time processing—generating print images "off line" and storing them for later retrieval by the printer—is not feasible at least because the amount of data involved in an average print run is too massive to be economically stored and rapidly accessed using conventional mass storage techniques.

To meet the data rate demands of prior generations of intelligent electronic printing engines, dedicated systems commonly known as Raster Image Processors ("RIPs") were developed to generate image data based on a compact input representation such as a PostScript file or other variable data stream. Some such prior RIP designs could not generate image data in real time. Thus, these prior RIPs suffered from the drawback that the data coming in from the input device had to be completely converted before any output data could be supplied to the output printing device and the print job could begin to run. This inability to rasterize in real time required each print job to be handled in two phases: an off-line conversion process, and a later on-line printing process. This caused delays, and was a severe problem with "just in time" requirements for delivery of completed print jobs to customers.

Some prior art RIP systems were, however, capable of generating image data "on the fly" while the print job was running. One example of a prior art raster image processor capable of generating image data in real time synchronism with printing operations is the "Hybrid RIP" ("H-RIP") manufactured by Moore Business Forms, Inc. and described in Technical Reference Manual entitled "H-RIP Technical Manual" (Moore Business Forms, Inc. 1994). The H-RIP system used dedicated hardware circuitry controlled by a microprocessor-based master controller to generate rasterized print image data in real time. Briefly, the prior art H-RIP system accepted, as an input, a standardized file format stored on a mass storage device such as magnetic tape. In this prior design, an intermediate "XL Data System" read the input file from the tape and supplied it to the H-RIP for processing. The H-RIP included an XL Interface that received and buffered the data from the XL data system and supplied the data to a microprocessor-based master controller. The master controller interpreted the input data and created a display list specifying the objects to be rendered on the next printed page. The master controller wrote bit map images of the fonts required to image the display list representation into a Font Image Memory ("FIM") to make these objects available for rendering. The master controller then controlled the FIM to write the bit map images into a Binary Image Generator ("BIG") including a pair of full-page bit map memories—thereby "rendering" a memory image of the entire page to be printed. While one page of image was being created in one of the full-page bit map memories, dedicated print engine control and interface circuitry could access an already complete memory image in the other memory and provide its pixel values to the printing engine in real time synchronism with paper "web" movement. Typically, the printer engine could not accept a full page at a time, but rather required the data to be presented to it in smaller "chunks" (e.g., in blocks comprising one or several lines of the image). The H-RIP supplied these "chunks" to the printer engine in synchronism with the engine's need for the data.

Moore's prior art H-RIP system was successful in its own right. However, further improvements were possible. For example, this prior art H-RIP system does not have sufficient speed and bandwidth to keep up with advanced high-speed high-resolution print engines now available. Additionally, the prior art H-RIP was limited to monochrome printing and had no color capabilities. Furthermore, this prior art H-RIP was limited to only a single input format, and could not handle graphical images efficiently. In addition, the prior art H-RIP could work with only a single type of print engine (a Moore Business Forms MIDAX® intelligent printer) and was incompatible with other print engine types. As discussed below, these shortcomings present severe disadvantages in some applications.

One disadvantage of the prior H-RIP design relates to its ability to work with only a single type of printer. The H-RIP was custom-designed to supply data to a Moore MIDAX® 300 intelligent printer, and was incapable of working with any other (non-compatible) printer. However, purchasers typically have a choice of several different models of intelligent printing engines, and larger printing facilities may have several different types of printers for use with different types of print runs. For example, one printer may be used for production of long print runs, another printer may be used for production of short runs which require high quality graphics and color, and a still further printer might be optimal for printing text with simplified graphics such as lines, boxes and angles. In the past, the print shop had to purchase a different RIP system for each different printer device since each RIP was specifically customized for a corresponding particular printer.

The requirement for several different types of RIPs (each of which may cost several tens of thousands of dollars, assuming they are even commercially available) led to great expense and confusion. For example, different RIP systems typically would have completely different cabling, installation, maintenance and other requirements. Technicians and operators had to be trained to service each of several dissimilar RIP systems. Spare parts for many different RIP systems had to be stocked. Software and input data incompatibilities between the different RIP systems required extensive logistical coordination to ensure that print jobs were prepared for the right combination of RIP and uniquely-associated print engine. These problems may have effectively limited the number of different types of printing devices a given printing facility could afford to have—thus decreasing the types of printing services that could be offered to customers.

Prior art RIPs such as the H-RIP also suffered from the disadvantage that it could only accept input data in a single standardized format. To use input data in a different format, a print operator would have to convert the data to the standard format (or use a different RIP designed to accept that different input format). Each time the printer operator wanted to use a different input format, he or she would have to convert the data to a format usable by the RIP associated with the printing device scheduled to print the job. The printer operator might have to custom tailor or purchase a RIP or other appropriate conversion system if no existing system would handle the new, non-standard format. Conversions off line were tedious, sometimes unreliable, and added substantially to the overall processing time and man hours required to complete a particular print job. For example, to process a single print order comprising multiple parts representing different input formats, the print operator might have to run the first part of the job, and then reset the system with a different RIP (which must be done off line) to interpret a different input format. He or she would then run the next part of the print set, and possibly thereafter reset and reconfigure the system again to run a further part of the job using a still different input format. The operator would have to continue in this fashion until the entire multi-part print job was completed—a rather lengthy, cumbersome and inefficient process which was quite time consuming.

Moreover, prior RIP designs such as the H-RIP were not capable of providing in excess of 300-million pixels per second required to drive high speed, high resolution monochrome and color electronic print engines. Prior RIP systems capable of generating color graphic images were limited to conversion speeds of about 100 million pixels per second—whereas the most current high resolution color printing engines can require data at rates in excess of three times that. Throughput and bandwidth problems are exacerbated by the ever increasing use of complex graphics in the intelligent imaging process. Processing operations related to graphics and adjusting portions of the page to accommodate the graphics can be very time-consuming operations, and full-color high resolution graphics take up a great deal of storage space. The manipulation of graphic images may also require the input data to be "screened" to provide appropriate color grades—adding even more processing time.

Thus, there has been a long felt need for a raster image processor that can receive inputs in various different formats (e.g., fonts, full color graphics, line art, patterns, etc.) from a variety of different input devices and is capable of generating outputs in different formats usable by different types of printing (or other) output devices. In addition, there is a need to provide a raster image processor having very high throughput that is also capable of screening and processing color data. There is also a need to provide a raster image processor that is modular and expandable to meet varying needs and requirements. Furthermore, it would be desirable to provide a raster image processor that can generate high resolution graphics data "on the fly" to supply in real time to a high speed print engine.

The invention of co-pending application Ser. No. 08/500,011 provides a raster image processor that can meet these objectives. It provides a raster image processing system and method that can keep up with the fastest high resolution printers now available. It can process images "on the fly"—that is, generate images from compact input representations so rapidly that printing can occur substantially in the same real time as the RIP processor processes the input data. This has substantial benefit to customers because it allows print orders to be turned around very rapidly, thereby satisfying the requirements of "just in time" delivery—which was not possible using some prior RIP based systems.

In the system of application Ser. No. 08/500,011, the ability to form print images in real time is further enhanced by the use of a high speed data cache and associated array disk drive to provide high speed throughput of data into the system. The disk array may, for example, store a library of high resolution graphics that can be accessed "on the fly" as needed in response to the input data stream. In the preferred embodiment, the disk array provides very high storage capability and throughput (e.g., total storage of 32 gb of information that can be accessed at a rate of over 50 mb per second). This allows the system to access graphical images while the particular print job is underway—enabling nearly simultaneous conversion, retrieval and printing of graphics and images. A data caching arrangement coupled to the disk array provides a FIFO (first-in-first-out) caching/buffering arrangement to maximize throughput and reduce access time.

To further enhance graphics capabilities, the system of application Ser. No. 08/500,011 may also provide a custom graphics accelerator that can generate, on the fly, many "primitive" or simple graphics (e..g, angles, lines, boxes, etc.) at the same time that the remainder of the print image is being generated.

A preferred embodiment of application Ser. No. 08/500,011 may, for example, provide a completely modular architecture including an XL interface module for input data synchronization and interfacing, a master controller module for overall control and coordination, a RISC high speed processor module for data conversion and manipulation, a Font Image Memory ("FIM") module for storing bit images of fonts, a Binary Image Generator ("BIG") module for double-buffered storage of full-page images, and an Engine Control Module ("ECM") controlling and interfacing with particular printer or other output devices.

In the processing and printing of documents, a job block or file is provided which contains a description of the entire job to be run including a page by page layout of the job. Once input is received, the RIP collects and assembles the characters and other image "objects" in a full page bitmap memory. The information provided with the job determines the size and positioning of text and graphics. The system automatically "remembers" where certain characters are positioned so as not to duplicate or overlay new characters.

The system of application Ser. No. 08/500,011 has been able to achieve vastly superior speeds to that of prior RIP based systems, and can operate at speeds upwards of 300 mega pixels per second. Part of the success of the system and its ability to operate at such high speeds, is that the preferred embodiment is also capable of "screening on the fly." That is, it can automatically screen data relating to the images so that the various gray scales or color levels are correct for a contone printing process. A number of other advantageous features provided by the system described in application Ser. No. 08/500,011 are explained in that specification.

The advantages and features offered by the system disclosed in co-pending application Ser. No. 08/500,011 provide a significant advance over the prior art. However, such systems can be quite costly and may provide more capabilities than are needed to run a particular print job. In certain applications, flexibility and extended capabilities may be of lower importance than reduced cost. For example, in some applications only a specific type of print engine will be utilized. In other applications, the RIP may only need to operate within a particular pixel range. Accordingly, it would be desirable to provide a scaled down raster image processor specifically for use with a particular print engine, such as an ink jet printer. Such a scaled down raster image processor requires more than simply eliminating optional features.

In accordance with the present invention, a scaled down RIP can be tailored to accommodate image generation in a particular range specifically to efficiently run print bars at a reduced equipment cost. The disclosed embodiment processes the input stream for a Moore independent cartridge array (MICA) ink jet printer, and is still capable of operating at relatively high speeds (e.g., upwards of 300 feet per minute). However, the preferred embodiment operates within a limited pixel range of, for example, 1024 pixels wide to 2048 pixels wide. Up to sixteen (16) ink-jet cartridges in an array may be driven with the preferred embodiment. Of course, the system could be configured for additional cartridges or for different types of printers.

In accordance with one aspect of the present invention, a personality module is provided. The personality module is responsible for requesting and reading raster data to build up the staging RAM. The preferred embodiment utilizes a pair of EEPROMs to control each bar read according to the position and distance from the other. Pixel data is then sent to the service station along with the print bar address. The personality module preferably outputs the sequence of pixel data to the service station for imaging, and interfaces the display and keyboard information and transfers the various offsets to a control ASIC for rehandling the pixel data at the staging RAM.

BRIEF DESCRIPTION OF THE DRAWINGS

These and other features and advantages provided by the present invention will be better and more completely understood by referring to the following detailed description of presently preferred examples of embodiments of the invention in conjunction with the drawings, of which.

DETAILED DESCRIPTION OF THE DRAWINGS

In describing the features, characteristics and advantages of the present invention, reference will be made initially to a preferred larger-scale raster image processor described in connection with co-pending application Ser. No. 08/500,011. Against that background, the present invention will be described with primary reference to FIGS. 7 through 23. It should be appreciated that the following description is directed to a preferred implementation, and that various modifications, adjustments and variations may be made according to particular needs. The present invention is not intended to be limited to the described embodiment. For example, although the present invention is described in connection with a MICA ink-jet printer, other printers can be utilized in which case appropriate changes and substitutions may be made in the described implementation.

Figure 1:
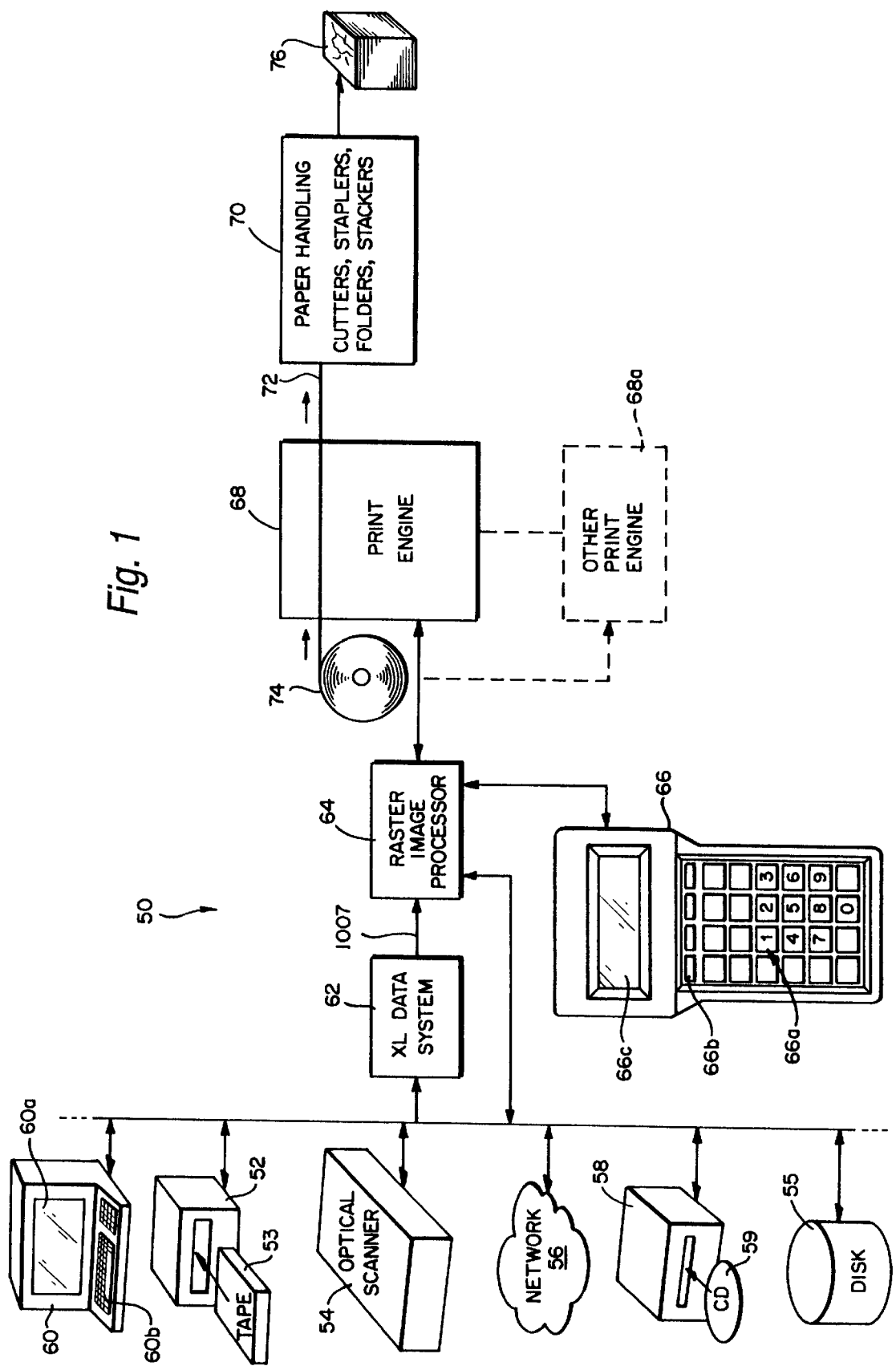
FIG. 1 is an example of an overall intelligent imaging system.

FIG. 1 shows an intelligent imaging system 50. System 50 performs the overall task of assembling digital image "objects" based on input digital data to create a visible image that can be viewed by a person. In this particular example, the visible image is printed onto a medium such as moving a paper "web" 72 to produce finished printed matter 76 that can be distributed and read or viewed.

Overall Intelligent Imaging System 50

Intelligent imaging system 50 may include various input data sources such as a magnetic tape drive 52, an optical scanner 54, a network 56 and a optical disk drive system 58. In addition, system 50 includes a "front end" computer system 60; an XL data system 62; and a raster image processor 64. Components 60, 62 and 64 are electronic devices that create, store, manipulate and process digital data to produce a digital representation of a visible image. In this example, system 50 further includes a print engine 68 and a paper handling mechanism 70. The print engine 68 may be a high resolution, high speed monochrome or color conventional print engine device, such as, for example, a Moore Business Forms MIDAX® print engine, a Scitex print head, or an Indigo high speed color printer.

The print engine 68 shown in FIG. 1 prints on a continuous "web" 72 of paper supplied, for example, from a large paper roll 74 at high speeds of up to 300 to 500 feet per minute. Print engine 68 includes electronic print heads that print images on web 72 as the web travels through the print engine (i.e., "plateless printing"). The printed web 72 is processed by conventional paper handling mechanisms 70 (e.g., cutters, staplers, gluers, folders, collators, stackers, etc.) to provide finished printed products 76.

The "raw materials" for the images to be printed by print engine 68 come from data sources 52–58. The system 50 accepts input data in a variety of forms including for example:

Images
  fonts such as outline font formats (e.g., Adobe type 1, Post Script, true type and bit stream);
  pre-generated Moore XLF format fonts;
LineArt in compressed or uncompressed format;
ConTone or full color graphics images;
Objects
  dynamic MCCS (Moore Command Code Stream) formatted data stream
  standard JIB oriented objects;
Screening tables;
Color lookup tables;
Executable software for raster image processor 64 to execute;
Job description file instructions including, for example, input text.

Various ones of data sources 52, 54, 56 and 58 may supply these various types of input data as may be convenient. For example, input text to be printed may be stored on magnetic tape 53 or magnetic disk 55. Optical scanner 54 may be used to scan in photographs or other images for storage on disk 55 and later retrieval. Optical drive 58 accepts optical disks 59 that may store a variety of information including, for example, line art, fonts, executables, etc. Network 56 may connect system 50 to other similar systems 50 and/or other computing and/or storage devices located locally or remotely.

"Front end" image handling system 60 enables users to input and correct full color images as well as line art, fonts and Post Script files. Front end 60 may be, for example, a general purpose digital computer such as a high-capability personal computer including a display 60a and a keyboard 60b. Front end 60 need not be co-located with the rest of system 50, but could be remote and communicate with XL data system 62 and raster image processor 64 via magnetic tape 53 and/or network 56, for example. Thus, for example, in one configuration the front end 60, optical scanner 54, optical drive 58 and disk 55 might be located remotely to the rest of the system 50, and produce as its "output" a job description file stored on magnetic tape 53. Magnetic tape 53 could then be physically carried to a production floor and inserted into another magnetic tape drive 52 coupled to XL data system 62, raster image processor 64 and print engine 68.

The "human" job coordinator operates front end 60 to perform a variety of tasks. For example, the human operator may, using front end 60, select and collect images from the various data sources such as continuous tone pictures scanned using optical scanner 54, continuous tone images stored on a Photo CD optical disk 59 or Post Script files supplied by magnetic tape 53 and/or disk 55 (or authored using the front end). The human operator also uses front end 60 to collect all line art such as graphics and logos, from either scannable line art or from Post Script files defining the graphics. The human operator also uses front end 60 to identify all fonts needed for a particular printing job, and if necessary, uses front end 60 to convert the font layout to an acceptable format. The job coordinator also uses front end 60 to select job layout and configuration. He or she will select and locate all objects to be printed on the finished printed products 76. The job coordinator creates, using front end 60, a "job description file" and supplies it plus all necessary fonts to raster image processor 64 via XL Data System 62 (for example, the job description file may be stored on magnetic tape 53 for later retrieval).

Raster image processor 64 is an electronic device that creates an image in computer memory based on the job description file provided by front end 60, and sends the digital image to print engine 68 for printing. More particularly, raster image processor 64 rasterizes variable combinations of text, graphics and continuous tone images at high speed based on an inputted job description file, and outputs the rasterized image in digital form to print engine 68 in real time synchronism with the operations of the print engine. Raster image processor 64 monitors the travel of web 72 through print engine 68 and synchronizes its operations with web travel. Raster image processor 64 also controls print engine 68 to provide correct print registration of the images the print engine prints on web 72. Raster image processor 64 thus coordinates with XL data system 62 to receive portions of the inputted job description file as they are needed, creates electronic images (in memory) to be printed on web 72, and supplies those electronic images in digital form at the rates, resolutions and formats required by print engine 68.

The raster image processor 64 may be capable of driving a number of different print engines or other output devices including, for example, Moore's MIDAX® print engine, Scitex print heads, and other imaging devices. FIG. 1 indicates this by showing another print engine 68a that may be coupled to the output of raster image processor 64 instead of print engine 68. In the preferred embodiment of co-pending application Ser. No. 08/500,011, no configuration changes to raster image processor 64 are required if the other print engine 68a is compatible with print engine 68. However, if the other print engine 68a is not compatible, then a simple swap of a single plug-in electronic control module within raster image processor 64 for another is all that would be required to allow the raster image processor to work with the other print engine.

The human operator may control raster image processor 64 through a hand-held data display terminal 66 that includes a keypad 66a, an array of light-up indicators (e.g., light emitting diodes) 66b, and an LCD display 66c. Terminal keypad 66a includes mode keys that select modules within raster image processor 64 to be controlled by the terminal. The human operator can use terminal 66 to read status information and error conditions, control operating parameters (e.g., feet per minute, offset, registration mode, type of registration, etc.), invoke reset and download, and perform a variety of other control operations.

Raster Image Processor Operations

Figure 2:
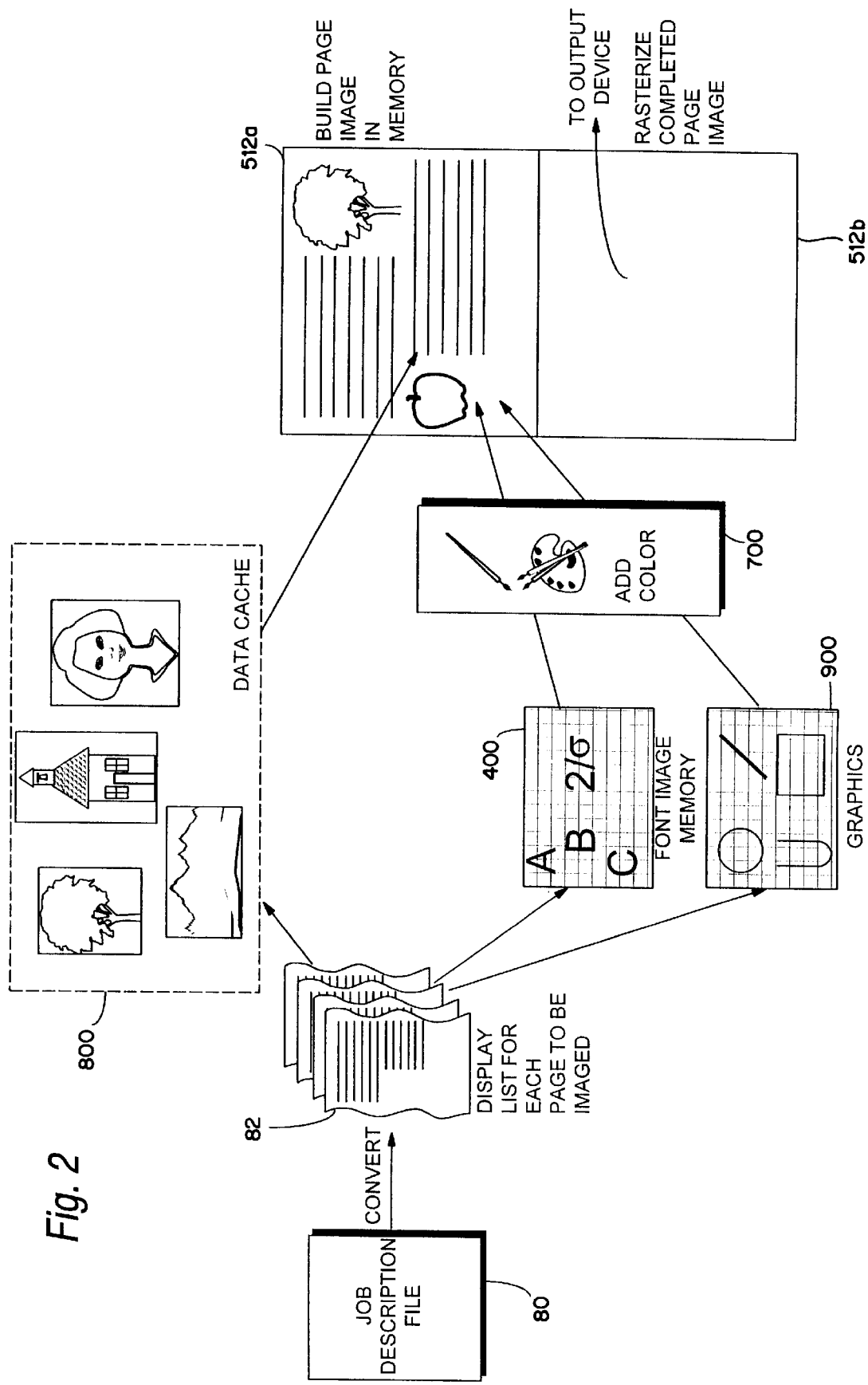
FIG. 2 shows overall example operations performed by the raster image processor shown in FIG. 1.

FIG. 2 shows the overall operations performed by the larger scale raster image processor 64. The "front end" 60 supplies a job description file 80 to the raster image processor 64. This job description file 80 typically contains a compact digital representative description how each of the pages of the finished printed product 76 will look. That is, for each different page to be imaged, a job description file will specify all text to appear on the page, identify the fonts to be used, specify any graphics or line art to be included, and also specify (if color imaging is employed) what colors are to be used. Job description file 80 essentially provides a complete representation in digital form of the entire print "job"—which may consist of many different pages of images.

Raster image processor 64 converts the job description file 80 into one or more "display lists" 82. Raster image processor 64 creates a display list 82 for the next (and each) page to be imaged. Display list 82 specifies objects and their corresponding positions on the page as well as color/density information and other characteristics. For example, display list 82 typically specifies text information to be imaged, the position of the text on the page, and the font the text is to be imaged in.

Raster image processor 64 interprets the display list 82 as a list of instructions specifying the next page to be imaged. Raster image processor 64 constructs a digital representation of a complete image in memory in accordance with the instructions contained within the display list 82. Raster image processor 64 interprets the display list 82 to identify all "fonts" (e.g., type styles) required to image the next page. The raster image processor then writes bit map images of the necessary fonts into a "font image memory" ("FIM") 400 so they are available for imaging. Raster image processor 64 also parses the display list 82 to identify all graphics images that need to be supplied to image the page. The raster image processor can generate some simplified types of graphics "on the fly". For example, if a special component called a "graphics accelerator" module 900 is present, the raster image processor 64 can generate curved lines, geometrical shapes, etc. "on the fly" in real time and supply them on an as-needed basis in response to the instructions within the display list 82.

For color imaging, raster image processor 64 may add color information to the font information supplied by font image memory 400 (and also to the graphics generated by graphics accelerator 900)—all as instructed by the display list 82.

The raster image processor 64 can also access pre-stored graphics such as color images, line art, etc., from a graphics library stored in a "data cache" 800. The raster image processor 64 may control "data cache" module 800 (if present) to retrieve and supply the appropriate graphics images as needed and specified by display list 82.

Once the various "objects" to be imaged are ready to be supplied, raster image processor 64 assembles them together to form a complete digital representation of the final image. This digital representation is stored in a "Bit Image Memory" 512. In a preferred embodiment of the larger scale raster image processor, Bit Image Memory 512 has "double buffers"—i.e., it has a pair of duplicate memories 512a, 512b each of which can store an entire image. This allows raster image processor 64 to output a completed image to the output device at the same time that it is creating the next image in the bit image memory 512 in real time.

In this example, each of Bit Image Memories 512a, 512b comprises a full page "bitmap" having discrete storage locations positionally corresponding to each position on the page that can be filled in with a dot. This bit mapped memory image may comprise four "bit planes" to provide a total of sixteen ($2^4$) color or monochrome density values. The graphics and line art provided by data cache 800 may supply the appropriate color information directly to Bit Image Memory 512.

When raster image processor 64 has finished storing a completed page image into one of Bit Image Memories 512a, 512b, it ceases accessing that bit image memory and begins working on a new image in the other Bit Image Memory. Output circuitry then accesses the completed image and output the data in a sequence and at a rate required by the print engine 68 being used. Thus, for example, raster image processor 64 may supply the completed bit mapped image one line at a time or multiple lines at a time as required by the print engine 68, and does so at timing synchronized with the movement of web 72 through print engine 68. While one part of the raster image processor 64 is accessing the completed memory image in Bit Image Memory 512a, another part of it may at the same time be building the next page image in its duplicate binary image memory 512b—and still another part of the raster image processor may be converting another portion of job description file 80 into a new display list 62 for the second-to-next succeeding page.

Architecture of Larger Scale Raster Image Processor

Figure 3:
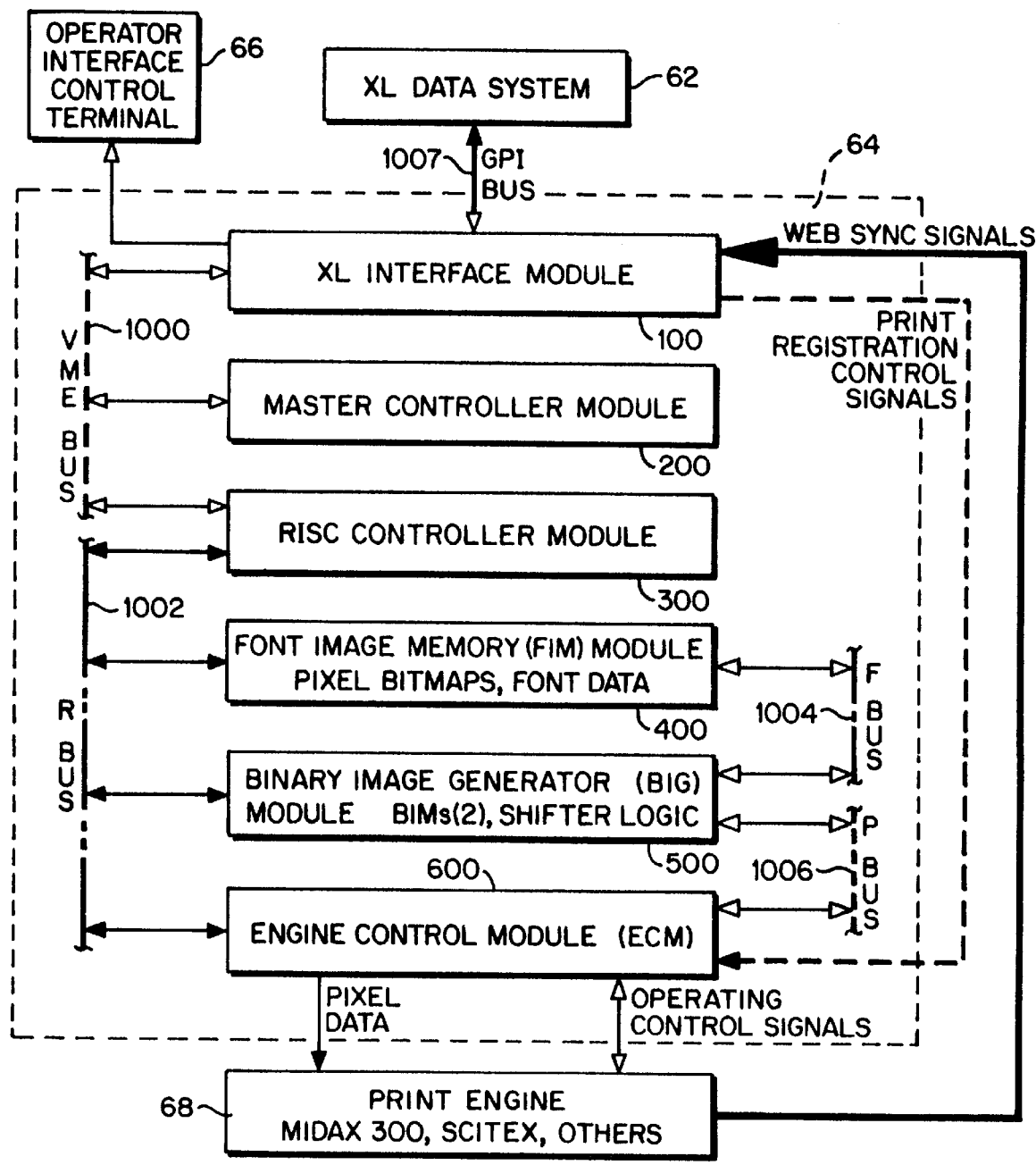
FIG. 3 shows an example architecture of the FIG. 1 raster image processor in accordance with co-pending application Ser. No. 08/500,011.

FIG. 3 shows an example modular architecture for larger scale raster image processor 64. Raster image processor 64 may be fully modular, and constructed based on a generalized bus architecture and associated back plane that allows the different modules (preferably each of which comprises a single printed circuit board) to be replaceably plugged in and out. This modular architecture provides easy expandability to add additional capabilities (compare FIGS. 3 and 3A), and also allows some modules to be swapped out for other modules to adapt to different requirements (e.g., different output devices such as different print engines).

In the example shown in FIG. 3, raster image processor 64 includes an XL interface module 100, a master controller module 200, a RISC controller 300, a font image memory ("FIM") module 400, a binary image generator ("BIG") module 500, and an engine control module ("ECM") 600. A VME bus 1000 provides communication between XL interface module 100, master controller module 200 and RISC controller module 300. An "R-BUS" 1002 allows communication (image, commands) between RISC controller module 300, FIM 400, BIG 500 and ECM 600. An F-BUS 1004 allows transfer of image date (e.g., fonts and logos) between the FIM 400 and the BIG 500. A P-BUS 1006 transfers final form image data from BIG 500 to ECM 600.

Figure 3A:
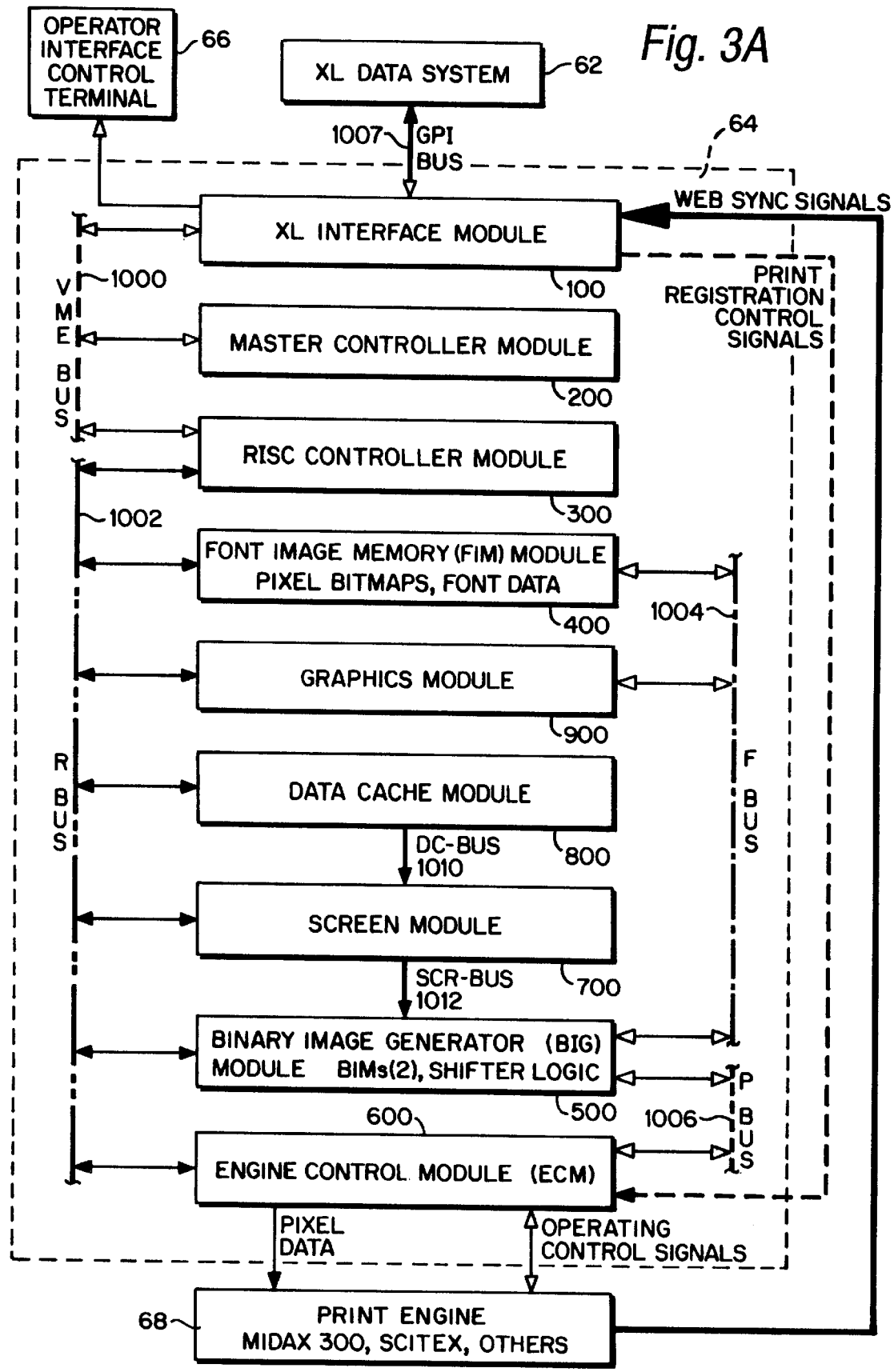
FIG. 3a shows the FIG. 3 raster image processor expanded to include screening, graphics and data cache capabilities.

As shown in FIG. 3a, R-BUS 1002 also provides communications to optional enhancement modules such as, for example, a screening module 700, a data cache module 800 and a graphics module 900. F-BUS 1004 allows transfer of image date between the FIM 400 and/or the BIG 500, and the graphics module 900. In addition, in this expanded configuration, data cache module 800 may communicate data to screening module 700 over a DC (data cache) bus 1010, and screen module 700 may communicate data to BIG 700 via a SCR (screen) bus 1012.

Briefly, the XL interface module 100 accepts the job description file 80 from an XL Data System 62 and supplies it for processing to master controller module 200. Master controller module 200 converts the job description file 80 into display lists 82, and supplies the display lists to RISC controller module 300 for imaging. The RISC controller module 300 coordinates the operations of FIM 400 and the BIG 500 (which contains the Bit Image Memories 512a, 512b) to generate the digital representation of the image based on the display list 82 for the next page to be imaged. The ECM 600 breaks the completed digital representation up into suitably sized "chunks" and provides them to print engine 68 exactly at the time the print engine needs them to print the next portion of the image.

The (optional) graphics module 900 generates vector graphics "on the fly" based on instructions from RISC controller module 300, and also is capable of efficiently de-compressing and/or scaling image files. The (optional) data cache module 800 stores a graphics library and supplies required prestored graphics information to screen module 700 in real time. Screen module 700 "screens" contone image files and provides the resulting pixelized data values to BIG 500.

More Detailed Description of Larger Scale Raster Image Processor Operations

Figure 4:
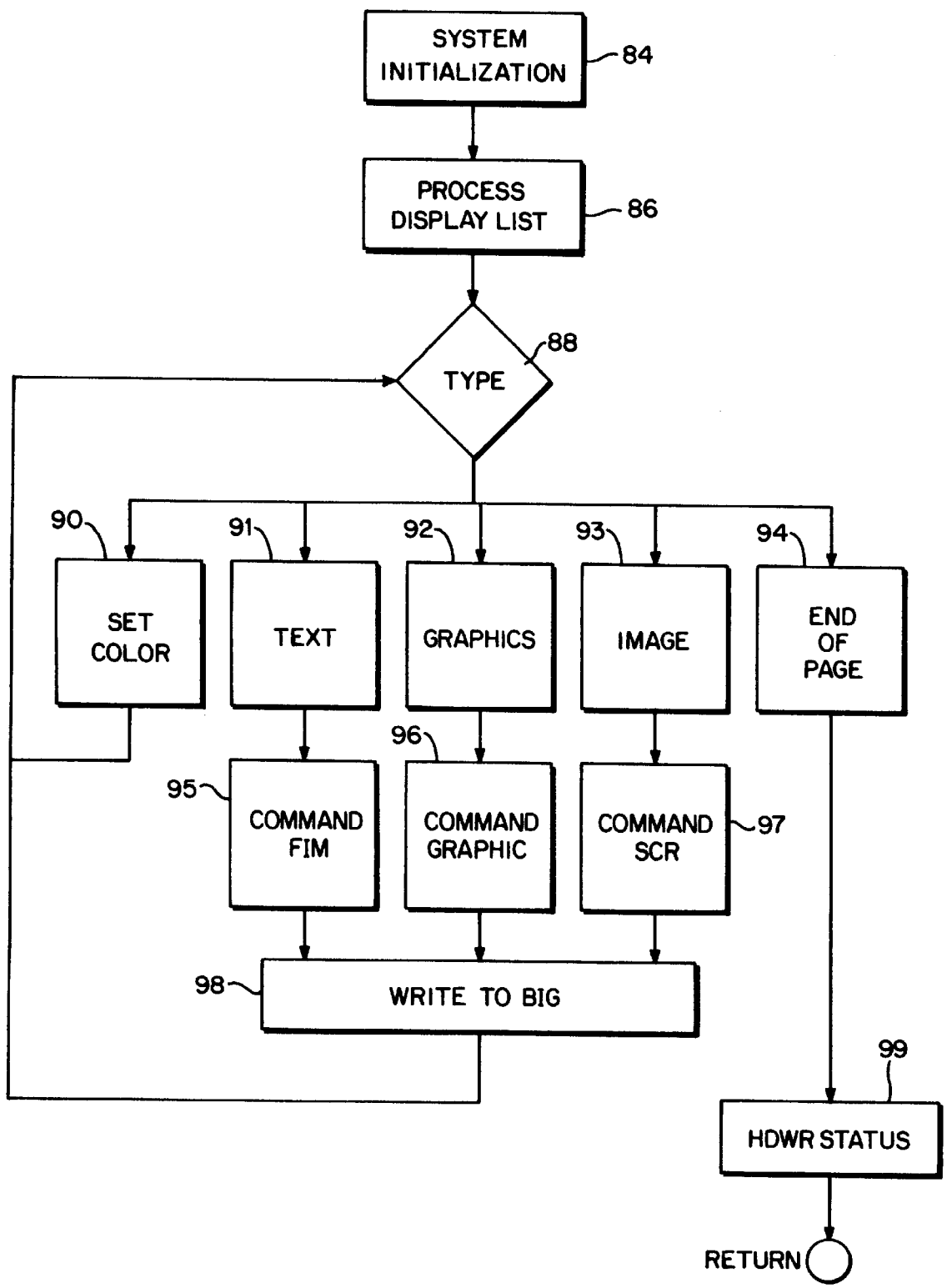
FIG. 4 is a flowchart of example overall control operations performed by the RISC controller module to control data processing by the raster image processor.

FIG. 4 is an example of a sequence of control steps performed by RISC controller module 300 to coordinate the various activities performed by raster image processor 64. Raster Image processor 64 and its associated RISC controller 300 begins operations by initializing (block 84). Then, RISC controller 300 looks for a display list 82 to process (block 86). Once the RISC controller 300 receives a display list 82, it begins parsing it (e.g., from top to bottom) to determine the type of objects it specifies (block 88). If the display list 82 "instruction" specifies a color, then RISC controller 300 sets the default color to the specified color for use in further rendering of text and graphics (block 90). If an "instruction" within display list 82 specifies text (exit block 91), RISC controller 300 sends a command to the FIM 400 (block 95) specifying the characteristics of the text characters to be imaged. If the display list 82 "instruction" specifies a graphic (exit block 92), RISC controller 300 sends a command to the graphic module 900 specifying the characteristics of the graphic to be generated (block 96). If an instruction within display list 82 specifies an image (exit block 93), RISC controller 300 sends a command to the Screen module 97 (block 97). This parsing process continues in an interactive fashion until RISC controller 300 encounters an "end of page" instruction (block 94)—at which time it checks hardware status (block 99) and "returns" to wait for arrival of the next display list 86 to process. Meanwhile, each of FIM 400, Graphic module 900 and Screen Module 700 writes its respective output into the bit image memory 512 within BIG 500.

More Detailed Discussion of Larger Scale Raster Image Processor Modules

The overall operations and architecture of raster image processor 64 are described above. The following provides additional, more detailed descriptions of each of the various modules within the larger scale raster image processor 64.

XL Interface Module 100

Figure 5:
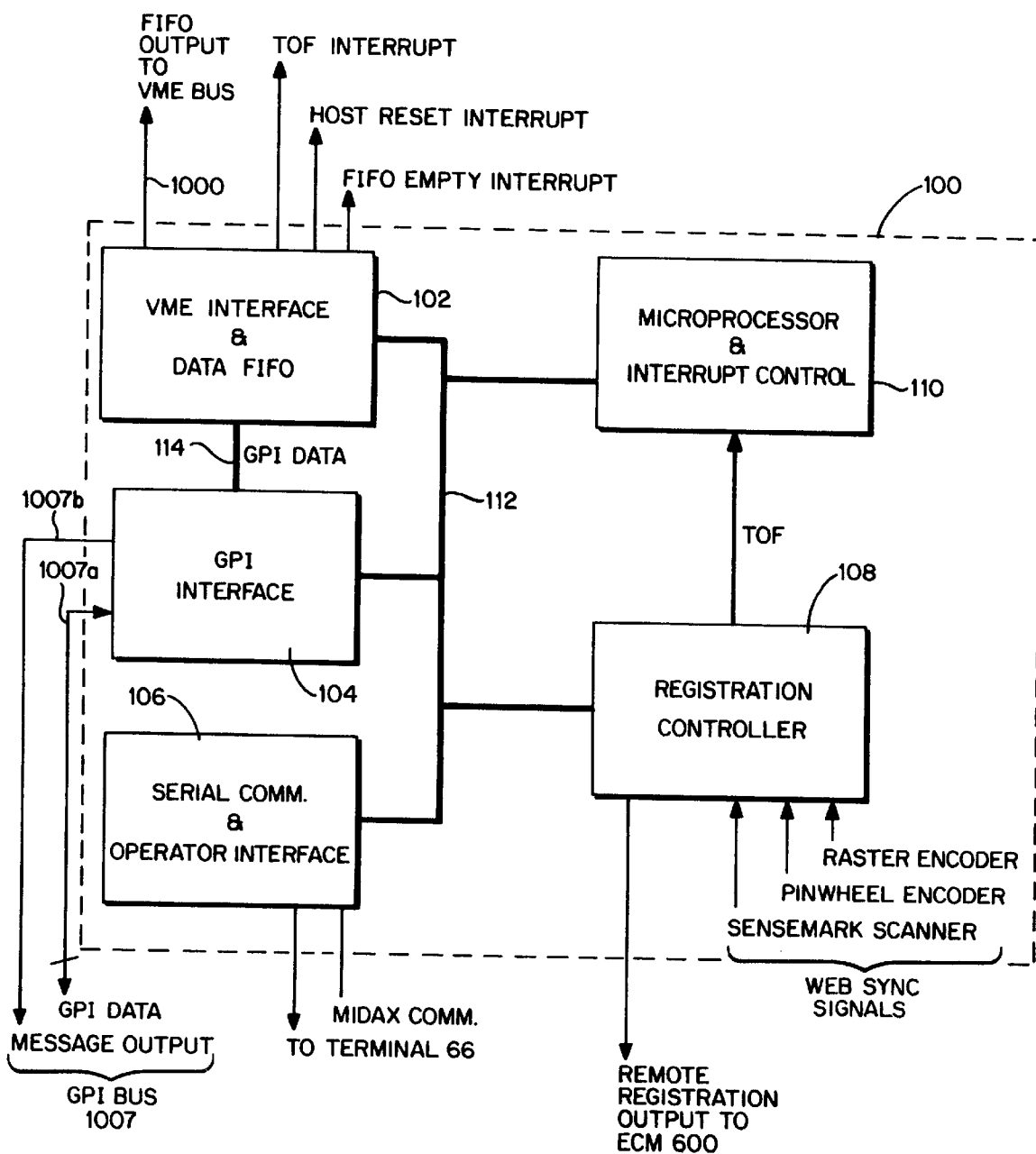
FIG. 5 shows an example architecture for the XL interface module.

FIG. 5 shows an example of an overall architecture for XL interface module 100. XL interface module 100 in this example is a microprocessor-based interface device that:

- provides communications between the XL data system 62 via the GPI bus 1007;
- provides web synchronization and registration control for the raster image processor 64;
- receives data from the XL data system 62 and buffers it into a FIFO (up to 16 mb); and
- drives operator control terminal 66.

In this example, XL interface module 100 includes a VME bus interface and data FIFO block 102, a GPI bus interface 104, a serial communications and operator interface block 106, a registration controller block 108, and a microprocessor and interrupt control block 110. An internal bus 112 allows blocks 102–110 to communicate among themselves. In addition, a further data path 114 between VME interface and data FIFO 102 and GPI interface 104 allows information to be rapidly transferred from the GPI bus 1007 and the VME bus 1000.

The overall operation of XL interface module 100 is controlled by microprocessor and interrupt control 110, which may include a Motorola 680180 microprocessor with 64 K-bytes of EPROM, 256 K-bytes of RAM and a decode and interface PASIC. In this example, microprocessor 110 controls all functions of XL interface module 100 except for those of data FIFO 102.

Registration controller 108 synchronizes the imaging operations of raster image processor 64 with the travel of web 72. Registration controller accepts web synchronization signals from various encoders and scanners disposed on print engine 60 to monitor the position and travel of web 72. In response, registration controller 108 generates print registration control signals which it provides to ECM 600. ECM 600 uses these print registration control signals to synchronize itself and print engine 68 with the movement and position of web 72.

Figure 6:
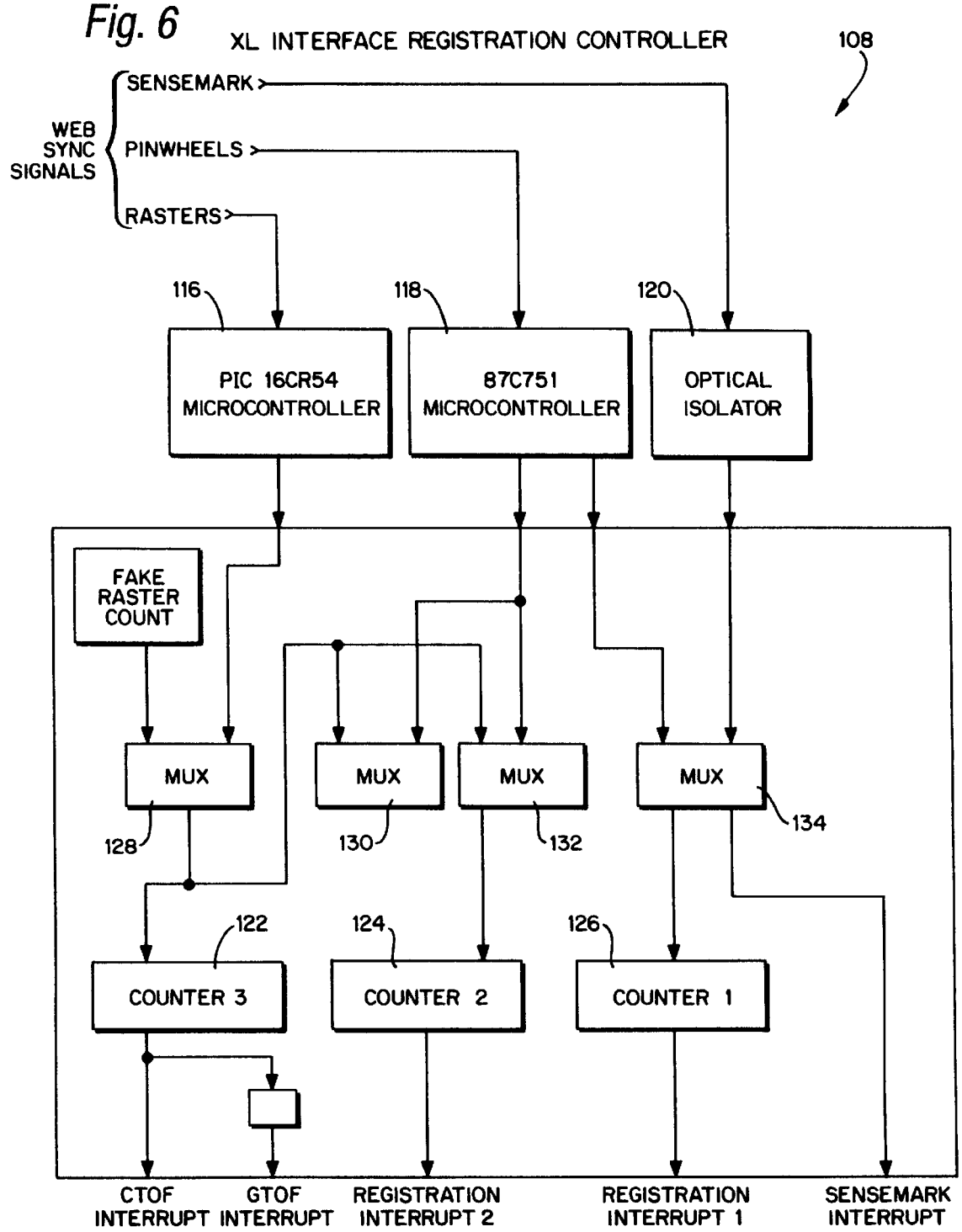
FIG. 6 shows an example architecture for the XL interface registration controller.

FIG. 6 shows a more detailed functional diagram of registration controller 108. The registration controller 108 includes signal conditioning devices 116, 118 and 120 to condition the web synchronization signals it receives. Registration controller 108 also includes registration counters 122, 124, 126 (implemented in this example by one or more PASICs—programmable application-specific integrated circuits) that keep track of the position of web 72 relative to the current (and next) page. An array of multiplexors 128–134 is used to select between the various web synchronization signals depending on the particular registration mode being used. The following table shows examples of how top-of-form is generated in each of five different registration modes:

| MODE | HOW TOP-OF-FORM IS GENERATED |
|---|---|
| Sensemark | Optical scanner senses a preprinted mark on the form |
| Pinwheel | Tractor-driven encoder with resolution of 36 pulses per inch |
| Tight Web | XL Data System's CUE signal |
| Plain Paper | Raster or pitch encoder |
| Fake Mode | Internally generated rasters Test only |

Based on this processing, registration controller 108 generates a top-of-form (TOF) control signal that it supplies to microprocessor and interrupt controller 110. This TOF signal is used as a primary synchronization control signal to synchronize raster image processor 64 with web 72 movement.

Referring once again to FIG. 5, GPI bus interface 104 includes two main functional sections. The first section receives data from GPI bus 1007 and passes it to the on board data FIFO 102 via data path 114. Microprocessor 110 can also pass data to data FIFO 102, using this channel during stand-alone operation. A second section of GPI interface 104 is used to pass message data back—serially—to the XL data system 62. The GPI bus 1007 in the preferred embodiment includes data path 1007a and a message output path 1007b for these respective purposes.

The serial communications and operator interface block 106 of XL interface module 100 comprises an 8-channel serial controller chip, serial bus drivers, and interrupt control circuitry for microprocessor 110. These channels enable all functional parts of raster image processor 64 to communicate with XL interface module 100 and display terminal 66.

The VME interface and data FIFO block 102 can be, in this example, configured with 4, 8 or 16 mb of memory. This block 102 is used to buffer data from the XL Data System 62 or other host data system to be accessed by master controller 200 across the VME bus 1000. The control logic within VME interface and data FIFO 102 may, for example, comprise a pair of PASICs. One of these PASICs may control the FIFO input, while the other may oversee the reading of the FIFO in the VME bus interface and decode. Interrupt arbitration for the three VME interrupts provided (FIFO empty, TOF and host reset) are also handled by this block 102 in this example.

In more detail, the FIFO controller section of block 102 may consist of DRAM and associated DRAM controller that can be configured as a 4, 8 or 16 Mb FIFO. Data from an input latch may be read and put into the main FIFO, and then moved into a smaller on-board 512-byte FIFO as the smaller one is emptied through the VME bus controller onto the VME bus 1000. The DRAM controller in this example produces three main cycles: read, write and refresh. The controller looks for data to be available in its input latch. When data becomes available, the controller performs a write cycle and writes the byte into DRAM. When the FIFO is not empty, and the 512-byte FIFO is not full, then a read cycle is performed to move the byte from the main DRAM FIFO to the 512-byte output FIFO. The DRAM controller also produces a refresh approximately every 15 ms to maintain valid data in the DRAMs.

The VME bus interface section within block 102 in this example contains a PASIC and other circuitry which controls the VME bus decoding and arbitration, as well as the FIFO output data shifting. The FIFO data can be accessed by either byte, word or long word in this example. Data is read from the 512-byte FIFO when not empty, and shifted into an output shifter. The output shifter is a 4-byte shift register in this example that shifts one byte at a time, down to the least significant bit location. As the least significant bit location is filled, the next byte is shifted into the next least significant position until all four bytes are filled. When a byte-wide VME read occurs, the first byte is shifted into the shifter. Next, the three remaining bytes and a new byte from the 512-byte FIFO are shifted simultaneously to fill the shifter again. This also occurs for word and long word FIFO accesses. Block 102 maintains a status register readable by main controller module 200 over the VME bus 1000 that indicates FIFO status and data availability. The VME interface portion of block 102 also includes 2 kB of dual-port RAM in this example that accessible by both the microprocessor 110 and by master controller 200 and RISC controller 300 over the VME bus 1000. This shared RAM is used for control and communication between XL interface module and master controller module 200.

Master Controller Module 200

Master controller module 200 includes a Motorola 68040 microcontroller in this example with an associated 4 Mb of RAM. Master controller module 200 is the master controller of raster image processor 64, and provides for communication between the XL interface module 100 and RISC controller module 300. The master controller module 200, which is based on a prior master controller design used in the prior art Hybrid RIP product, performs various control and processing operations under software control. For example, master controller module 200 maintains a Job Information Block (JIB) that contains information for each line to be imaged including start information, font, rotation, placement and line length. Master controller module 200 also maintains a Font Address Memory that stores the starting pointers of each character within FIM 400. As master controller module 200 processes job information passed to it by XL interface module 100, it passes the information over VME bus 1000 to a memory within RISC controller module 300.

Additional details concerning the structure and operation of RISC Controller 300, Font Image Memory 400, Binary Image Generator 500, Engine Control Module 600, Screening Module 700, Data Cache 800, and Graphics Module 900 are provided in co-pending commonly owned application Ser. No. 08/500,011, which has been incorporated herein by reference. These details are not repeated here.

The Scaled Down Raster Image Processor

The foregoing high resolution real time raster image processing system and method provides a significant advance over the prior art. Nevertheless, not all situations warrant the speed, power and flexibility provided by the raster image processing technique described above. Even eliminating optional features (compare FIGS. 3 and 3A) leaves a system having speed, power and flexibility which is often not needed or desirable for a particular situation. Accordingly, the present invention allows for a scaled down, reduced cost, high speed raster image processor system capable of generating high resolution images in real time.

Figure 7:
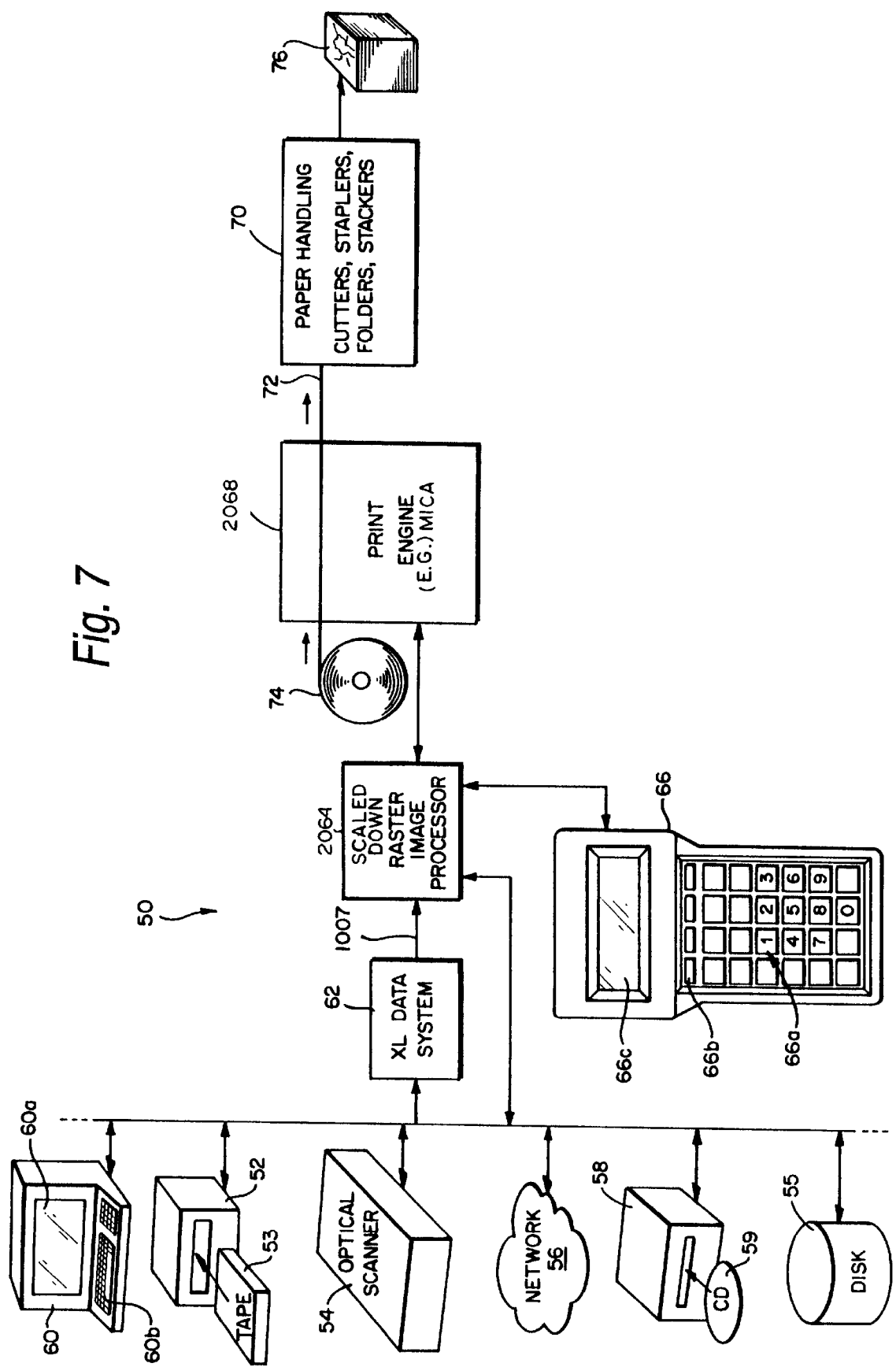
FIG. 7 shows an example of an overall intelligent imaging system in accordance with the present invention.

Referring now to FIG. 7, an example of an overall intelligent imaging system in accordance with a preferred embodiment of this invention is shown. The intelligent imaging system of FIG. 7 is similar to that of FIG. 1, and like features are identified with like reference numerals. In the system of FIG. 7, the scaled down raster image processor 2064 including a personality module (discussed below) which tailors the operation of the raster image processor 2064 for a particular print engine. The exemplary embodiment disclosed here is described in connection with a Moore® Intelligent Cartridge Array (MICA™) ink jet system. Of course, other print engines may be employed.

Figure 8B:
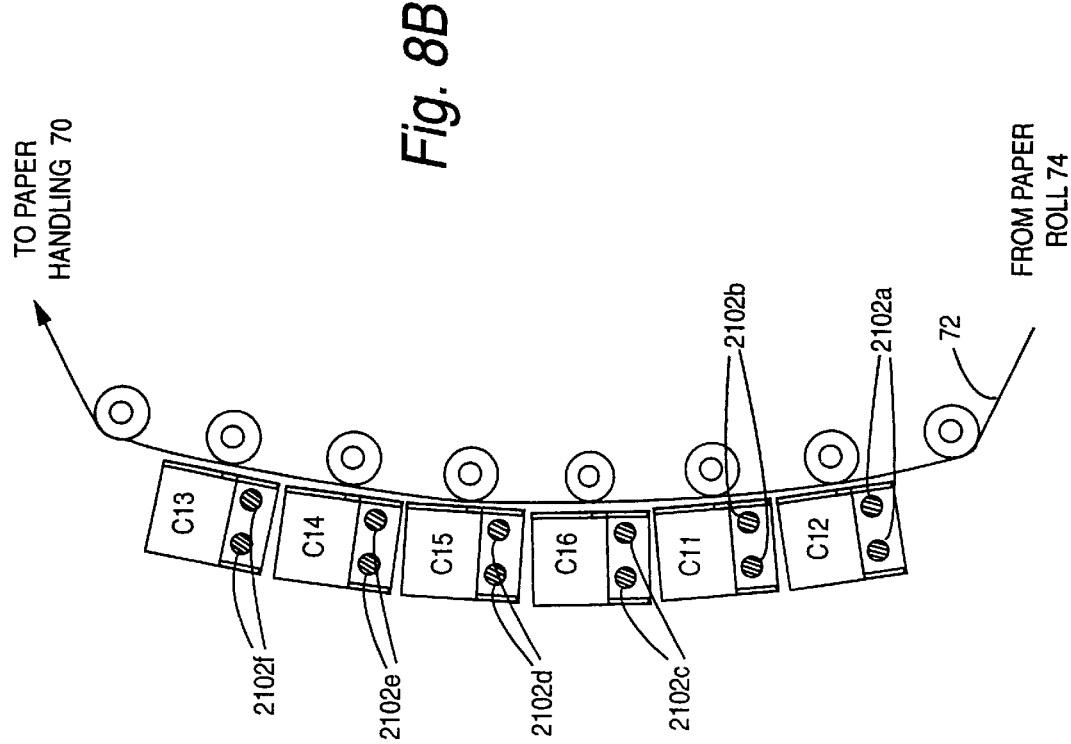
FIGS. 8A and 8B show an arrangement of MICA ink jet cartridges which may be used in connection with the present invention.
Figure 8A:
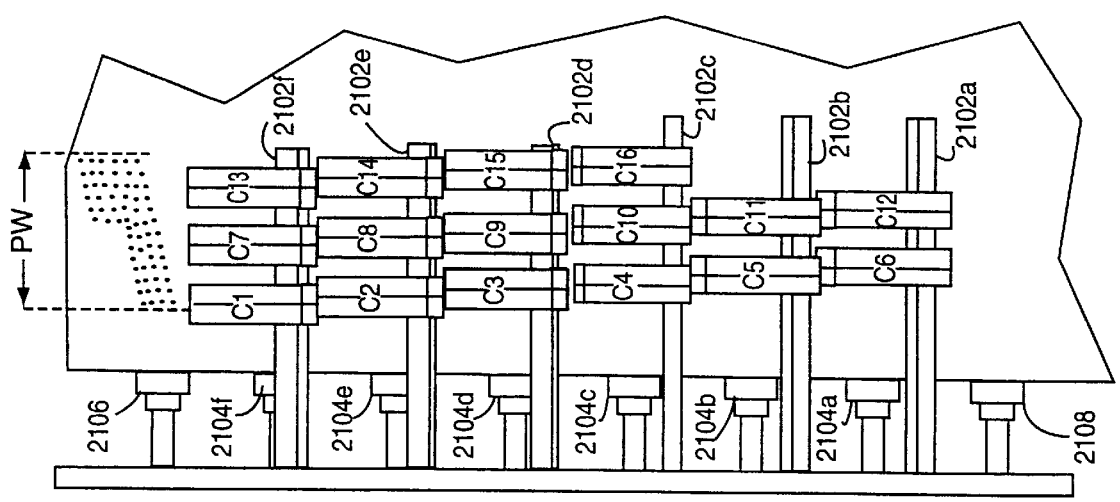

A MICA print system is shown schematically in FIGS. 8A and 8B. FIG. 8A is a front view illustrating a plurality of individual ink-jet cartridges C1–C16 mounted on specially designed brackets 2102a through 2102f. As seen better in FIG. 8B, each of the brackets 2102a through 2102b includes a pair of parallel rails. Each bracket 2102a through 2102b spans across the web 72 in a direction perpendicular to the direction of web movement. Ink-jet cartridges C1, C7 and C13 are mounted on bracket 2102f; ink-jet cartridges C2, C8 and C14 are mounted on bracket 2102e; ink-jet cartridges C3, C9 and C15 are mounted on bracket 2102d; ink jet cartridges C4, C10 and C16 are mounted on bracket 2102c; in-jet cartridges C5 and C11 are mounted on bracket 2102b; and in-jet cartridges C6 and C12 are mounted on bracket 2102a.

Each of the ink-jet cartridges includes a print head arranged adjacent a roller. In particular, the ink jet cartridges mounted on bracket 2102a (i.e., cartridges C6 and C12) have print heads adjacent roller 2104a; the ink-jet cartridges mounted on bracket 2102b (i.e., cartridges C5 and C11) have print heads adjacent roller 2104b; etcetera. Guide rollers 2106 and 2108 are provided to facilitate web travel. FIG. 8B shows that the centerlines of the respective print heads pass through the center of the associated roller 2104a through 2104b.

As can be seen in FIG. 8A, each of the ink-jet cartridges is arranged slightly adjacent other cartridges to obtain print coverage over a printing width PW. Thus, as the web 72 moves from paper roll 74 to paper handling equipment 70, the ink jet cartridges C1 through C16 print sixteen adjacent bars. If a wider printing width PW is desired, additional cartridges could be provided.

Referring back to FIG. 7, the scaled down raster image processor 2064 is capable of performing fewer operations than is the raster image processor 64 of FIG. 1 (see FIG. 2). For example, the preferred embodiment of the scaled down raster image processor, as configured for use with the MICA printing system, does not provide color, grey scale, or pattern (e.g., cross-hatching) printing, includes no graphics board, no image cache, and no screening module. Thus, there are substantial cost savings.

Figure 9:
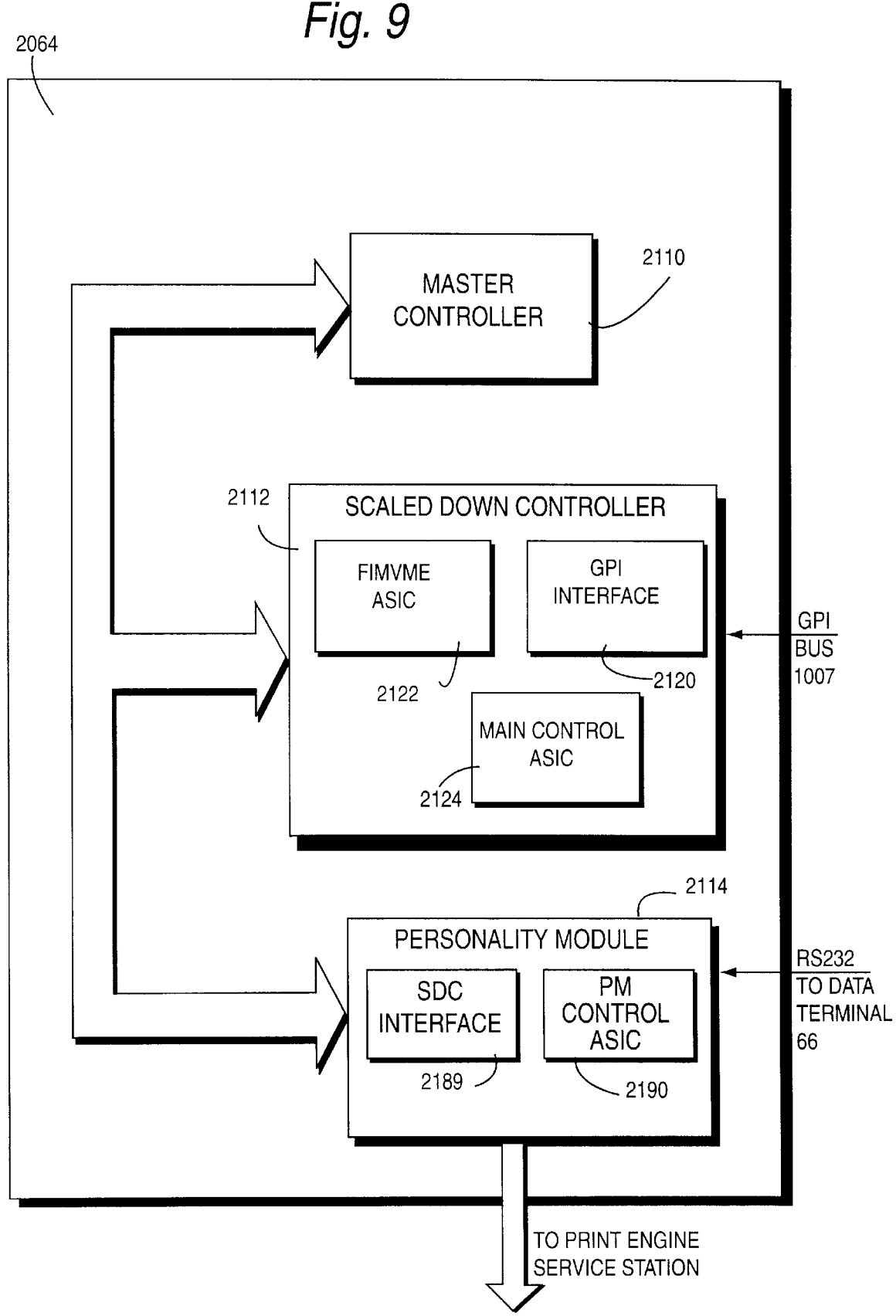
FIG. 9 shows an example general architecture for a scaled-down raster image processor in accordance with a preferred embodiment of the present invention.

FIG. 9 illustrates an example architecture for a scaled down raster image processor 2064. The preferred embodiment of the scaled down raster image processor utilizes a portable cabinet having a generalized bus architecture and associated back plane that allows different modules (e.g., printed circuit boards) to be replaceably plugged in and out. The architecture permits flexibility by permitting a particular module to be swapped out for other modules. For example, a module designed for use with the MICA print system could be replaced by another appropriate module if a different print engine was employed.

In the example shown in FIG. 9, the scaled down raster image processor 2064 includes a master controller module 2110, a scaled down controller module 2112, and a personality module 2114. The master controller module 2110 decodes GPI data, rotates font data and transfers data to FIM. During production it sends command codes, font addresses, X and Y positions, X and Y sizes, combination logic control signals, line draws, and form sizes. It also processes errors and the corresponding message blocks, then sends them back to the GPI.

The scaled down controller 2112 stores font data, decodes and carries out display lists, builds BIM and outputs pixel data to the engine control module (in this case, the personality module). The scaled down controller also keeps track of raster pulses and starts the exact print position.

The personality module 2114 receives pixel data and directs the pixel data to the staging RAM according to bar position and bar offset. As discussed below, the bar offset compensates for displacement of the ink-jet print cartridges relative to one another in the direction of web movement. The personality module also outputs the sequence of pixel data to the print engine service station for imaging, it interfaces display and keyboard information, and transfers top-of-form (TOF) offsets and bar offsets to a control ASIC for rehandling pixel data at the staging RAM. The personality module 2114 may be provided as a daughter board to the scaled down controller 2112. This allows the personality module to be readily replaced if desired.

The cabinet preferably provides a number of outside connectors to the modules. For example, an RS232 connection is provided for interfacing and data communications with the hand-held controller 66 (FIG. 7). The hand held controller is preferably a QTERM-II unit from QSI Corp, Salt Lake City, Utah. Additionally, a GPI bus 1007 is provided. The GPI bus is preferably a shielded electrical cable that acts as the pathway for print data generated by the raster image processor, control signals by the XL Data System 62, and status messages returned by the print device.

Although the system is described in connection with a hand-held controller 66, it is also possible to utilize, for example, built in keyboards and display screens. The preferred Q-Term hand held unit 66 includes forty membrane keys, six LEDs, and a four line by twenty character LCD display. The top row of keys may operate as "MODE" keys which are used to select the board/function that will be communicated with by the Q-Term controller 66.

When a MODE key is pressed, a corresponding LED will light continuously to indicate the selected operating mode. For a given mode, a particular RIP board has control of the display, and pressing any of the "non-mode" keys will send a key code, corresponding to the key pressed, back to the selected board. If a different mode key is selected, the board which is presently controlling the hand-held terminal 66 surrenders control to the new board.

Examples of the various modes include Registration, RIP and Setup. The Registration and Setup modes are the primary modes which an operator controls the MICA print engine.

In the Registration mode, the user can specify to the scaled down RIP 2064 the type of registration to be used for a particular job. For example, the operator can specify the direction of web travel, relative to a MICA registration sensor. The operator can also adjust a top-of-form (TOF) offset.

When in the Registration mode, the Q-Term display preferably shows the version of software that is being used and the current date; the second line may display the size of the form being printed (e.g., FS=27.00) and the current mode of the scaled down RIP 2064 (e.g., NORMAL); the third line may display the resolution of the current print job, which might range for example from 72 dpi TO 360 dpi; and the fourth line can display what offset, if any, is in effect and speed parameters such as maximum available speed and current speed. In the preferred embodiment, the maximum offset increment is one inch and the minimum is one pixel. The maximum offset value is the form size minus on inch.

The web travel direction is preferably specified through an encoder phase change menu. The setting is chosen in accordance with the web travel direction and the position of a web travel encoder to inform the system whether the encoder will turn clockwise or counterclockwise. A TOF offset menu allows the operator to adjust the top-of-form offset. Both the offset movement and the total offset may be adjusted.

In entering the Setup mode, the Q-Term display indicates the print engine speed in feet per minute, and shows the status of error status indicators, once the Setup mode is entered, the operator may set individual cartridge parameters. For example, a malfunctioning cartridge could be disabled, and the coarse and five bar offsets (i.e., the "Y" position of data on the form) can be adjusted. An option is preferably provided to return all offsets to default values.

The master controller 2110 is preferably a commercially available Motorola MVME162 card. A number of bus structures are provided on the modules to operate with the master controller. For example, the scaled down controller 2112 includes a VA (1–31) bus which operates as a VME address bus. VA0 is defined internally by the MVME162 DS0 and DS1 (lower and upper words, respectively). As discussed further below, the VA bus address is decoded by a FIMVME ASIC 2122 of the scaled down controller before addressing other device registers on the scaled down controller or the personality module. The scaled down controller also includes a VMEDAT (0–31) bus, an FDAT (0–15) bus, a VDAT (0–7) bus, an XA (0–5) bus, an XB (0–5) bus, a Y (0–11) bus, a BDAT (0–31) bus, and an ENCBUS (0–9) bus. The VMEDAT bus is a thirty-two (32) bit bus for command and font data transferred to INPUT FIFOs by the MVME162. The INPUT FIFO's output narrows to a sixteen (16) bit transfer of FIM and command data to support 16 bit register architecture. The FDAT bus is preferably a sixteen (16) bit bus for handling the outputs of the INPUT FIFOs. The VDAT bus is a bidirectional bus and provides command, status and messages. The XA and XB buses carry the lower word address and the upper word address of BIM, respectively. The Y bus provides the BIM length (e.g., maximum length in inches 27.3). The BDAT bus is provided for BIM/Pixel data. The BDAT bus turns into the PDAT bus on the OUTPUT FIFOs, and goes to the MVME162 data bus to be used for diagnostic purposes. The ENCBUS provides registration information as well as data on web movement and type of registration to FIMVME ASIC 2122 on the scaled down controller for evaluation and calculation.

The personality module preferably includes a PDAT (0–31) bus, a CA (01-) bus, an X (0–4) bus and a Y (0–11) bus, a CDAT (0–15) bus, an ADDR (0–5) bus, a PIC (0–7) bus, and a CB (0–6) bus. The PDAT bus permits pixel data to be loaded into the staging RAM by the control ASIC 2124 of the scaled down controller 2112. The CA bus provides data pathways for chip select, address register, resets, rasters and synchronization signals The X bus indicates BIM width and the Y bus indicates BIM length. The CDAT bus carries printer (e.g., MICA) data added with coarse and fine Bar offset. The ADDR bus carries Bar numbers, the PIC bus carries Bar offsets (coarse and fine) from EEPROMs to control ASIC and Status, and the CB bus permits handshaking between ASIC and PIC.

Figure 10:
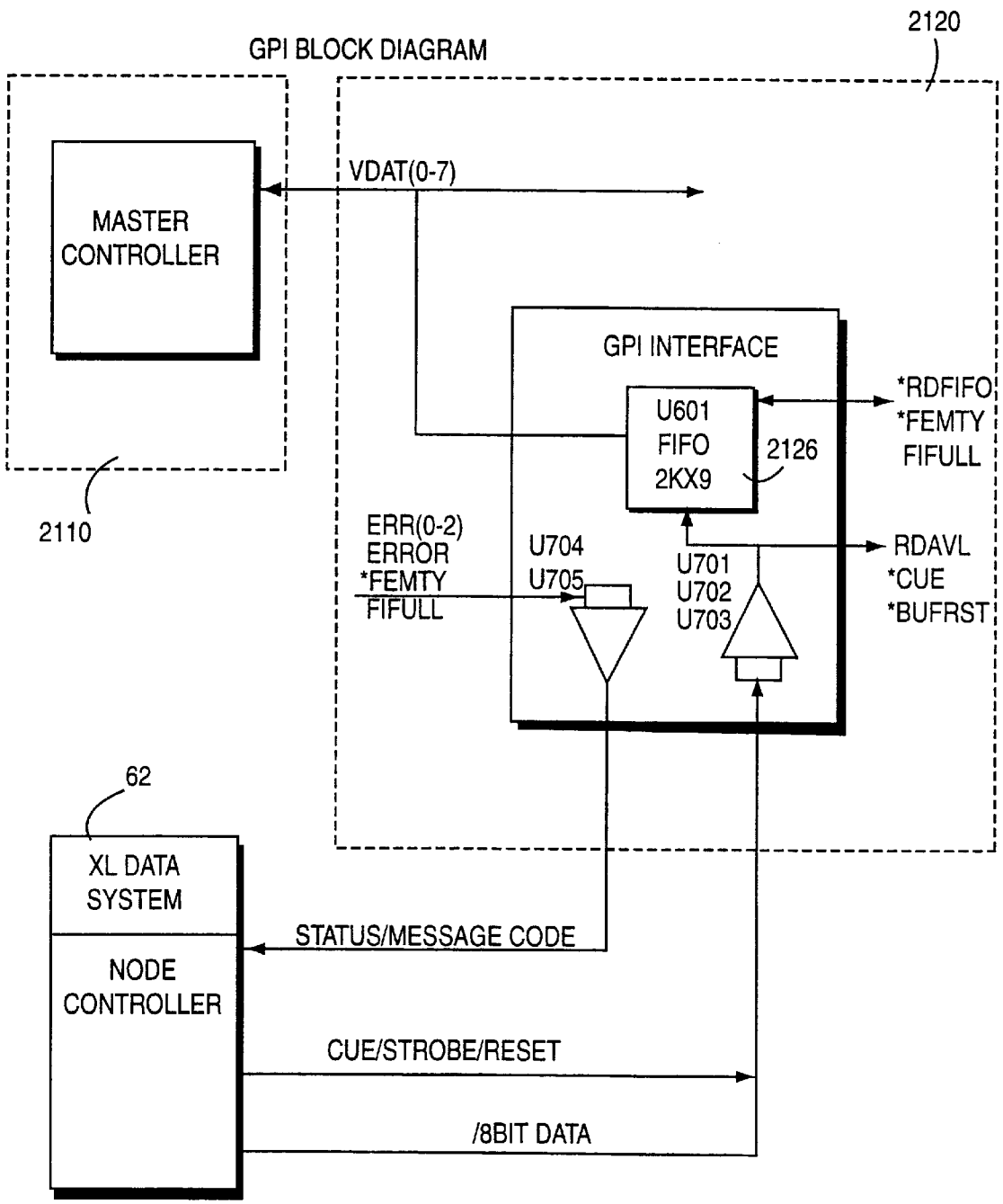
FIG. 10 shows an example of a GPI interface section of a scaled down controller portion of a raster image processor which may be used in accordance with a preferred embodiment of the present invention.

The scaled down controller 2112 includes a number of dedicated sections. These dedicated sections include: a GPI Interface Section 2120, a VME Interface/FIM (FIMVME) Section 2122, and a Controller Section 2124. The operation of the GPI Interface Section 2120 will be described in greater detail with reference to FIG. 10. It should be noted that only the portions of the scaled down controller which bear on the GPI interface are illustrated in FIG. 10.

The GPI interface 2120 preferably includes three receivers (U701–U703), two drivers (U704, U705) and a GPI input FIFOs 2126. The receivers and drivers condition the incoming and outgoing signals to and from the GPI bus. The GPI input FIFO 2126 buffers the incoming data. Data appearing on the GPI bus from the XL Data System 62 is received eight bits at a time at receivers U701 and U702, then loaded into FIFOs 2126 by a strobe signal (*GSTROBE) received through receiver U703. Data is then read to the master controller 2110 via the VDAT bus. This data transfer cycle is initiated by the *RDFIFO signal. If the FIFO issues a full (FIFULL) or empty (*FEMTY) signal, an error signal is sent back to the XL Data System 62 over driver U705. In addition to the strobe signal which loads data into FIFOs 2126, the receiver U703 passes *CUE, Receive Data Available (RDAVL), and *BUFRST signals. The RDAVL signal informs the FIMVME that the XL Data System is ready to receive another message block. The *CUE signal is used to signal the scaled down controller 2112 when to start printing. The *BUFRST signal is issued on download and clears all GPI input FIFOs 2126.

The driver U704 sends a message block (including, for example, ERR0–ERR2) to the XL Data System 62, and activates an ERROR signal upon any hard error or system crash. An ONLINE signal may be issued through driver U705 to signal the XL Data System 62 that the GPI interface 2120 is ready to receive data.

Figure 11:
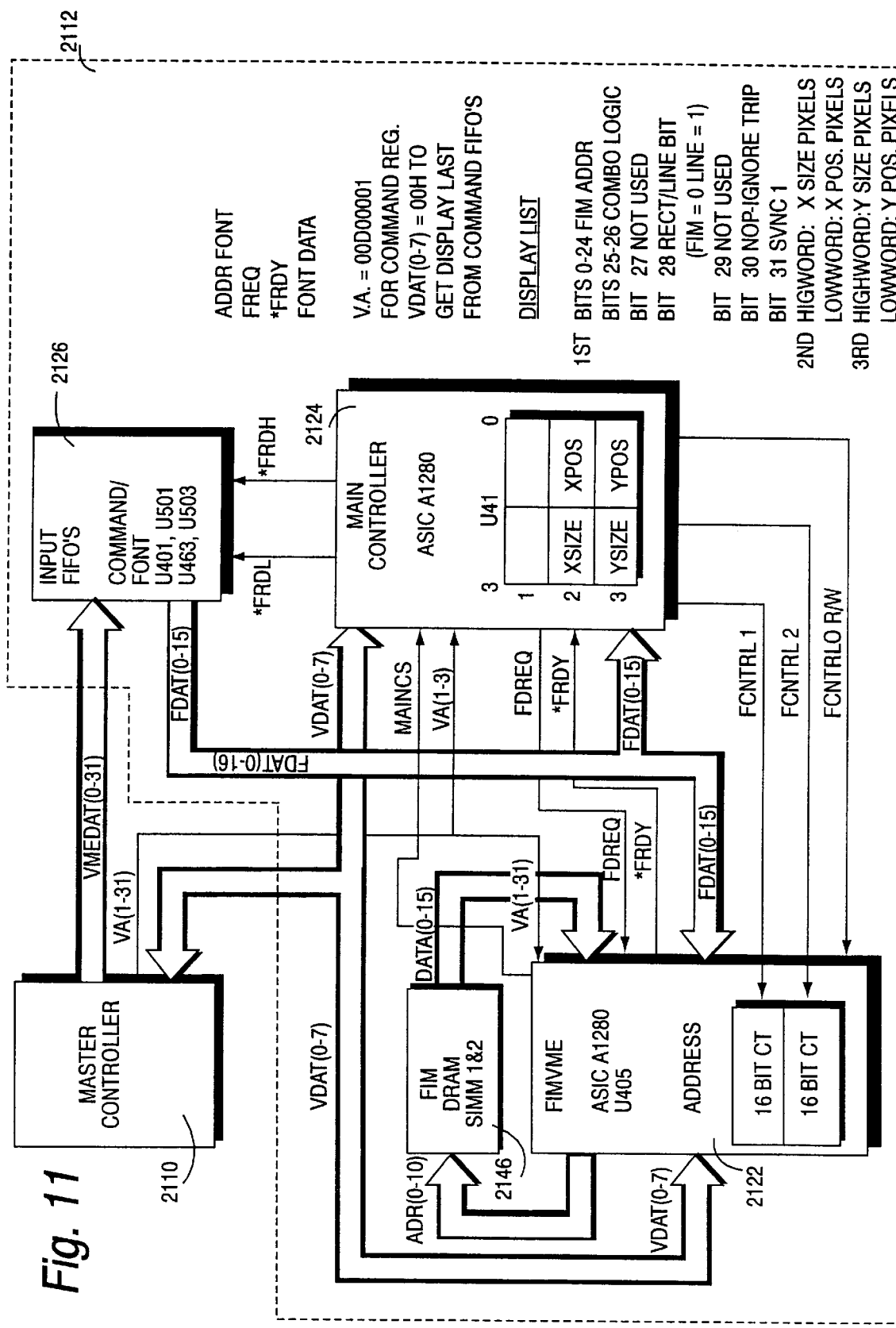
FIG. 11 shows an example of a VME interface and font image memory (FIM) section of a scaled down controller which may be used in accordance with a preferred embodiment of the present invention.

The scaled down controller 2112 also includes a VME Interface/FIM Section (FIMVME) 2122, which is described in greater detail with reference to FIG. 11. FIG. 11 is a block diagram useful in illustrating the operation of the FIMVME section of scaled down controller 2112. A plurality of octal buffer/line drivers (not shown) may be provided for multiple signal transfer to various logic devices. One transceiver may be provided for bidirectional 8 bit commands and status. A single-ended driver may be provided for handshaking of interrupt acknowledge (IACK) and data transfer acknowledge (DTACK) signals. Preferably the FMVME section utilizes an appropriate ASIC technology such as an ACTel A1280 Field Programmable Gate Array (FPGA) Application Specific Integrated Circuit (ASIC). The ACTel A1280 features eight thousand gate array gates, twenty thousand PLD equivalent gates, two hundred ten TTL packages, sixty nine 20-pin PAL packages, twelve hundred thirty-two programmable logic modules, and nearly one thousand flip-flops. Such ASIC technology permits large integration of multiple logic arrays that would otherwise congest the board overlay.

Figure 12:
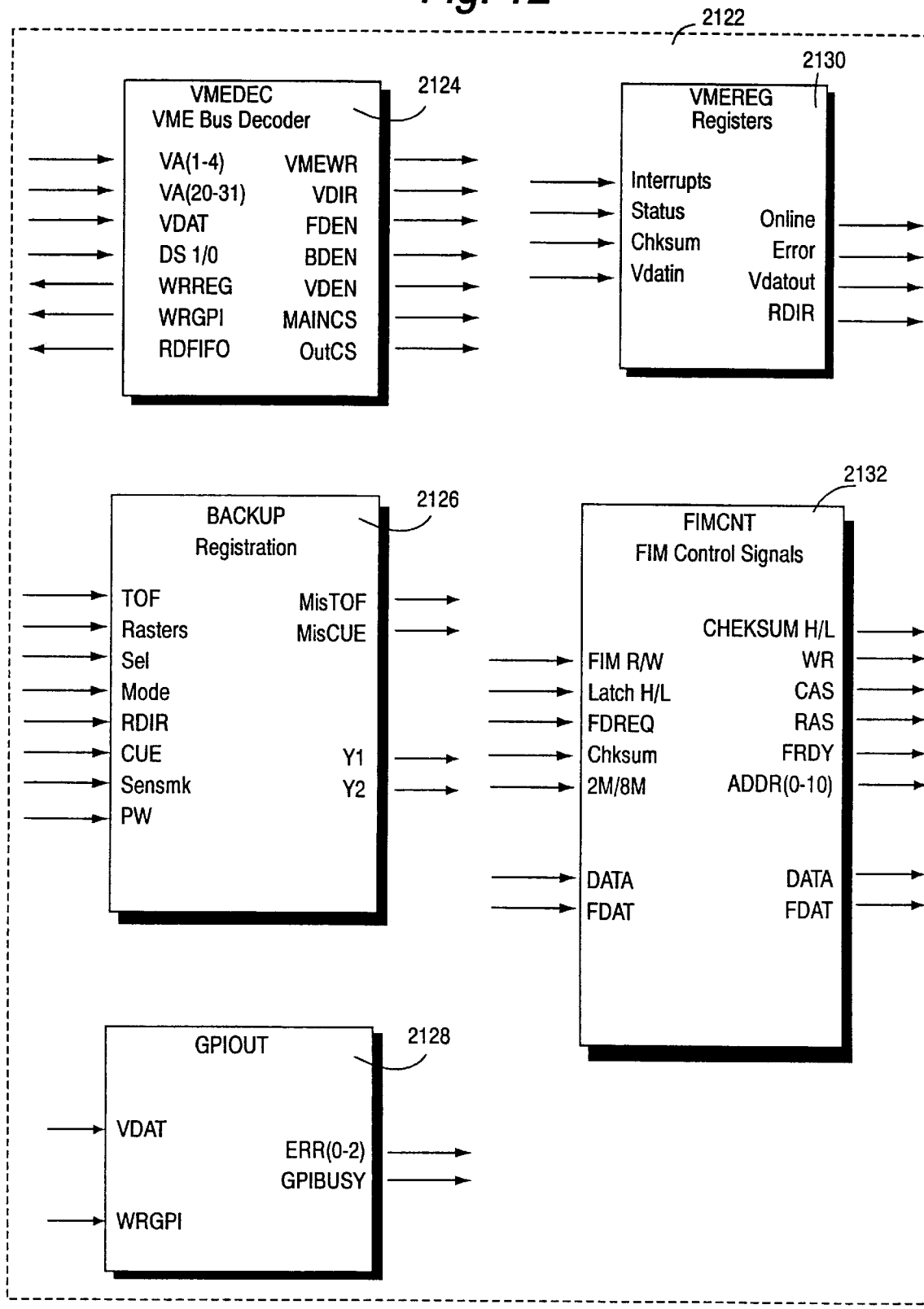
FIG. 12 shows an example substructure architecture of a FIMVME ASIC which may be used in connection with the preferred embodiment of the present invention.

FIG. 12 represents a functional block diagram of the substructure architecture for the FIMVME ASIC 2122. As illustrated, the FIMVME ASIC 2122 implements a VME Bus Decoder section 2124, Backup Registration section 2126, GPI Output section 2128, VME Register section 2130, and FIM Control Signal section 2132. When the master controller 2110 writes to the input FIFOs 2126, it first addresses the FIMVME section 2122. The VME Decoder 2124 of the FIMVME section 2122 decodes the address bits (VA 1–4) to produce an enable signal FDEN, which enables the line drivers U701 and U702 (FIG. 10) to send the display lists and font data at thirty-two bit transfers to the input FIFOs 2126. When the master controller 2110 writes commands or reads GPI code/status/errors/interrupts from the VDAT bus, it also address the FIMVME section 2122 to enable the VME data enable (VDEN) line and the VME direction enable (VDIR) for transceiver U307. The BDEN signal is used for performing system diagnostics. All signals to the FIMVME 2122, except for VDAT (0–7), IACK and DTACK, are sent out from master controller 2110.

The VME portion 2124 of the FIMVME ASIC 2122 decodes addressing information from the master controller 2110, thereby reducing the need for all thirty-two address bits. Thus, less expensive 16 bit registers may be utilized. The upper address bits from the master controller 2110 determine which ASIC (FIMVME 2122, Main Controller 2124 or Personality Module 2114) is being addressed by the master controller 2110. The FIMVME 2122 decodes address bits VA 20–31, with bits VA 20–23 specifying the selected ASIC. Once the address bits are decoded, the FIMVME 2122 issues chip select signals (Main CS) to the main controller ASIC 2124 or (OUTCS) to the personality module 2114. The lower address bits represent the absolute address at the selected ASIC.

Figure 13:
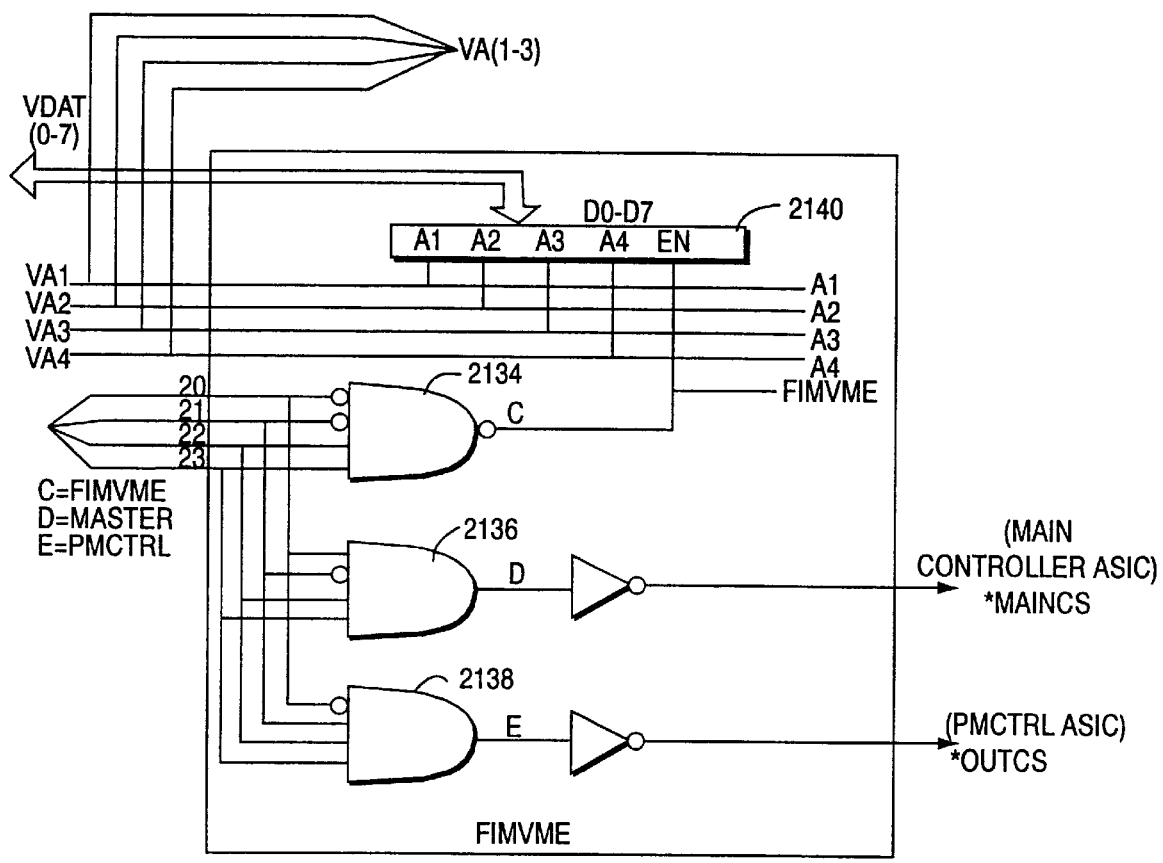
FIG. 13 schematically illustrates address decoding which may be implemented by a FIMVME ASIC in accordance with the preferred embodiment of the present invention.

FIG. 13 schematically illustrates the address decoding implemented by the VME Bus Decoder 2124. Decoder logic circuit 2134, decoder logic circuit 2136, and decoder logic circuit 2138 each receive as inputs address bits VA20 through VA23. Depending on the digital address appearing on lines VA20 through VA23, one of the FIMVME ASIC 2122, the Main Controller ASIC 2124, and the Personality Module Control ASIC will be selected. In other words, the inverter 2140 and 2142 associated with the values appearing on address lines VA20–VA23 will cause the logic circuits to uniquely drive one of the chip select signals FIMVME, MainCS or OUTCS. As noted above, the low order address bits VA1 through VA4 operate as the absolute address for the selected address. Thus, when the FIMVME ASIC 2122 is selected, the output of logic circuit 2134 acts as an enable signal for register 2140 to permit data to be read from the bus VDAT for storage at the memory location designated by address bits VA1 through VA4.

The FIMVME ASIC 2122 is also responsible for print registration wherein it monitors and compensates for web and press movement. It also sets up the Y lines to the registration control section, and utilizes a registration selector switch position to determine the output registration mode. The system may be set up at manufacturing by utilizing a direction bit to assign a direction of web movement. Thus, printing will be oriented properly when raster pulses are read according to the displacement of RASA or RASB. A counter set is added to the direction setting to provide information in case the press creeps backward at a stop.

Figure 14:
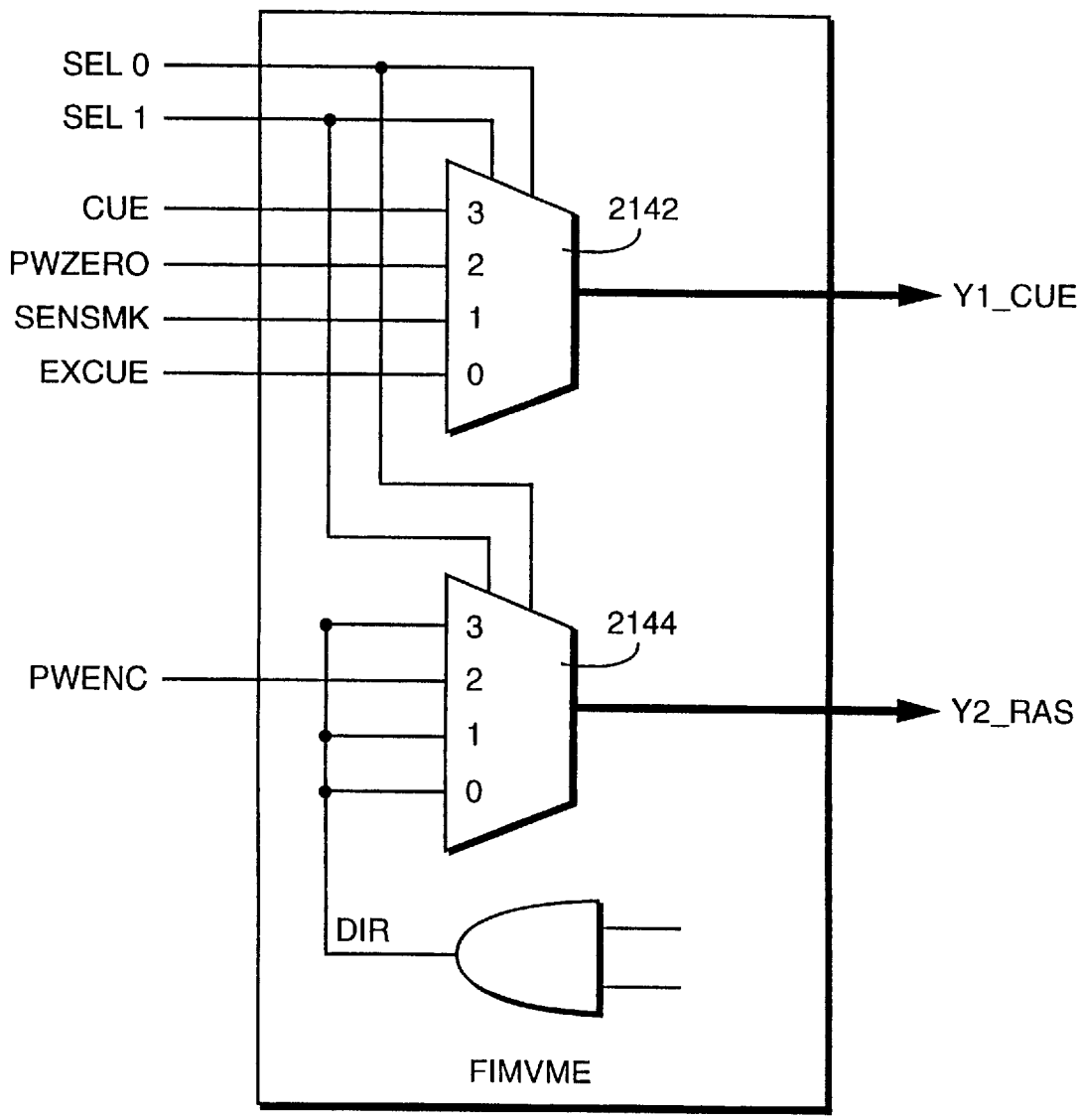
FIG. 14 schematically illustrates a registration operation which may be implemented by a FIMVME ASIC in accordance with the preferred embodiment of the present invention.

FIG. 14 is a block diagram useful in illustrating the operation of the registration mode. Multiplexers 2142 and 2144 are provided and operate to output Y1(CUE) and Y2(RAS) signals. The multiplexer 2142 receives as inputs web synchronization signals CUE, PWZERO (pinwheel zero), SENSMK and EXCUE (external cue). The multiplexer 2144 receives a pinwheel encoder (PWENC) input at one terminal, and a directional input at the other three input terminals. A pair of mode control signals SEL0 and SEL1 determine the operating mode. For example, if SEL0 and SEL1 are both low, the registration controller operates in the external mode, and multiplexer 2142 outputs the signal EXCUE as the Y1(CUE) signal. The multiplexer 2144 outputs the direction signal DIR as the Y2(RAS) signal in the external mode.

For the Sensemark mode of operation, SEL0 is set high and SEL1 is set low. Thus, Y1(CUE) is the SENSMK input to multiplexer 2142 and Y2(RAS) is the DIR signal. In pinwheel mode, SEL0 is low and SEL1 is high. In this case, Y1(CUE) is the pinwheel zero signal PWZERO, and Y2(RAS) is the pinwheel encoder output PWENC. Finally, in NORMAL mode, SEL0 and SEL1 are both high, Y1(CUE) is the CUE input from the XL data system to multiplexer 2142, and Y2(RAS) is the DIR signal.

The FIMVME ASIC 2122 controls accessing read/write to FIM. During a job download, the master controller 2110 will rotate the font according to job parameters, and then load the input FIFOs 2126 (see FIG. 11) with the starting address and character at a thirty-two bit transfer rate. The master controller 2110 addresses the main controller ASIC 2124 of the scaled down controller 2112 via the FIMVME ASIC decoder (FIG. 13) and, at the same time, writes a command byte [VDAT(0–7)] to the main controller ASIC 2124 indicating that address and FIM data is in the Input FIFOs 2126 and will be written to FIM DRAM 2146 (FIG. 11). The FIM DRAM 2146 may be two SIMMs 4M×8 bit dynamic RAM with storage capacity for 255 fonts.

Figure 15:
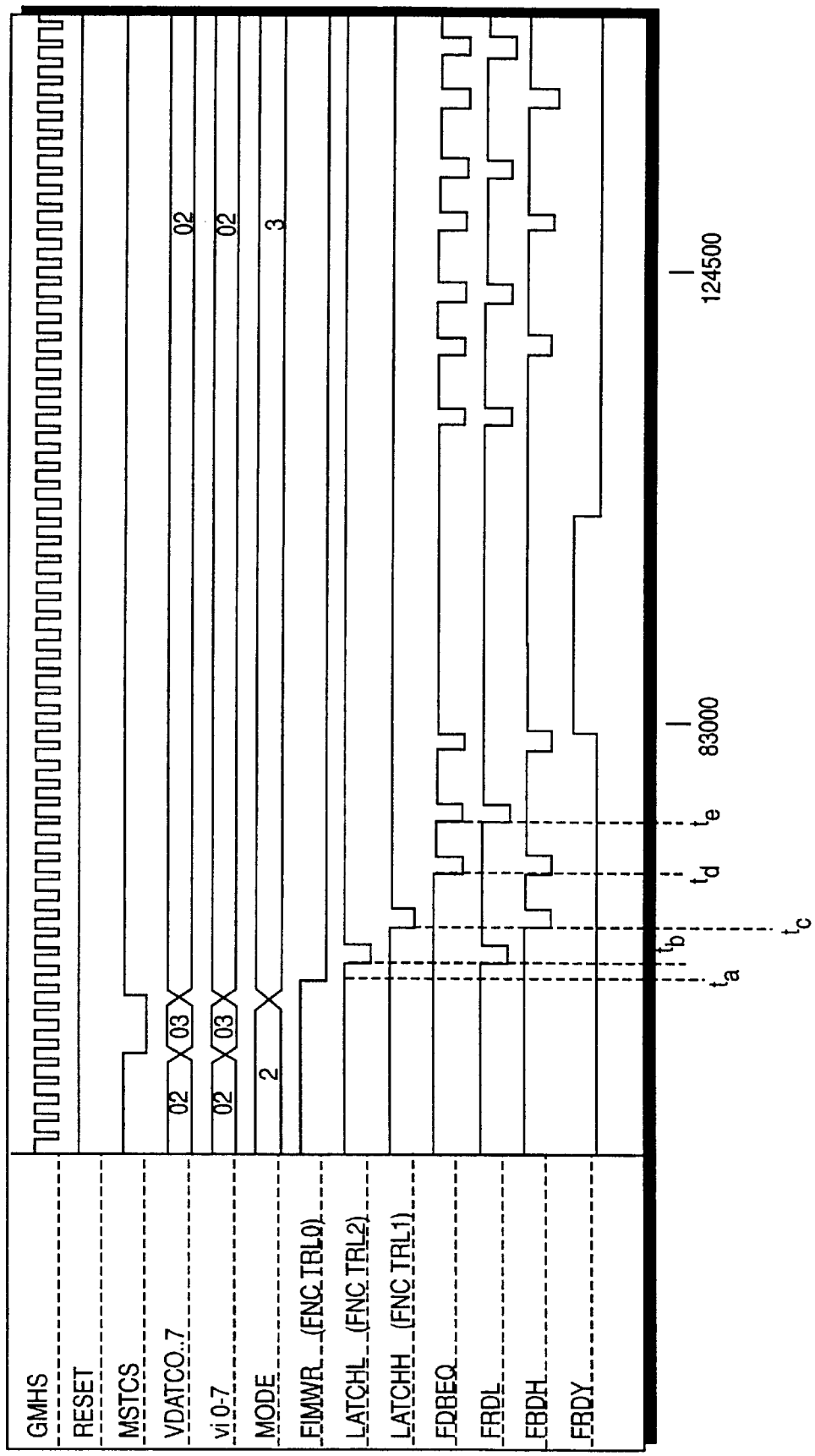
FIG. 15 is an example timing diagram illustrating a write cycle for storing information in FIM in accordance with a preferred embodiment of the present invention.

A typical write cycle is illustrated in FIG. 15 This explanation of a write cycle should be considered along with the block diagram of FIG. 11. To initiate the write cycle, at time $t_a$ the main controller 2124 sets low the FIMWR line (FNCTRL0) and keeps it low until a new command word is received from master controller 2110.

Next, at time $t_b$, the main controller 2124 enables a high word read by driving low the FRDH signal to the input FIFOs 2126. This causes the input FIFOs to put the low address word on the FDAT bus. The low address word is latched into the FIMVME address counters under control of the LATCHL (FNCTRL2) signal from the main controller 2124. The main controller 2124 then causes the high address word to be latched into the FIMVME counters. To accomplish this, at time $t_c$, the main controller 2124 drives low the read high word signal FRDH to the input FIFOs 2126, causing the FIFOs to put the high address word on the FDAT bus. A latch signal LATCHH (FNCTRL1) is generated by the main controller 2124 to cause the high address word to be latched into the FIMVME counters.

With the complete FIM address locked in the counters of the FIMVME ASIC 2122, the main controller 2124 grabs FIM data. The main controller 2124 again enables the read high signal FRDH by driving it low at time $t_d$ to retrieve FIM data from the input FIFOs 2126 and place it on the FDAT bus. At the same time, the font data request signal FDREQ goes active (low), forcing an internal signal to latch the data to registers in the FIMVME ASIC 2122. Additionally, the FIMVME ASIC 2122 makes busy (high) the ready signal FRDY as the *RAS, *CAS and *WR signals are enabled to generate the row and column address strobes for the FIM DRAM 2146. The FIM DRAM 2146 is addressed and data loaded. For each request, the FIMVME ready signal FRDY will go busy until the write to FIM DRAM 2146 is complete.

The address counters in the FIMVME ASIC 2122 are then incremented for the next sequential address.

At time $t_e$, FIM data is again transferred from the input FIFOs 2126 to the FDAT bus by driving the *FDRL signal active (low) and latching it into the FIMVME with latch signal FDREQ. Another word is then written into FIM DRAM 2146. These transfers continue until the font has been completely loaded to FIM DRAM 2146, or until the main controller 2124 is interrupted. A read FIM function may be performed for diagnostics or debugging purposes. Such a read operation would have similar signal timing shown in FIG. 15, except that the FIM data appearing on the FDAT bus comes from the FIMVME ASIC 2122.

Figure 16:
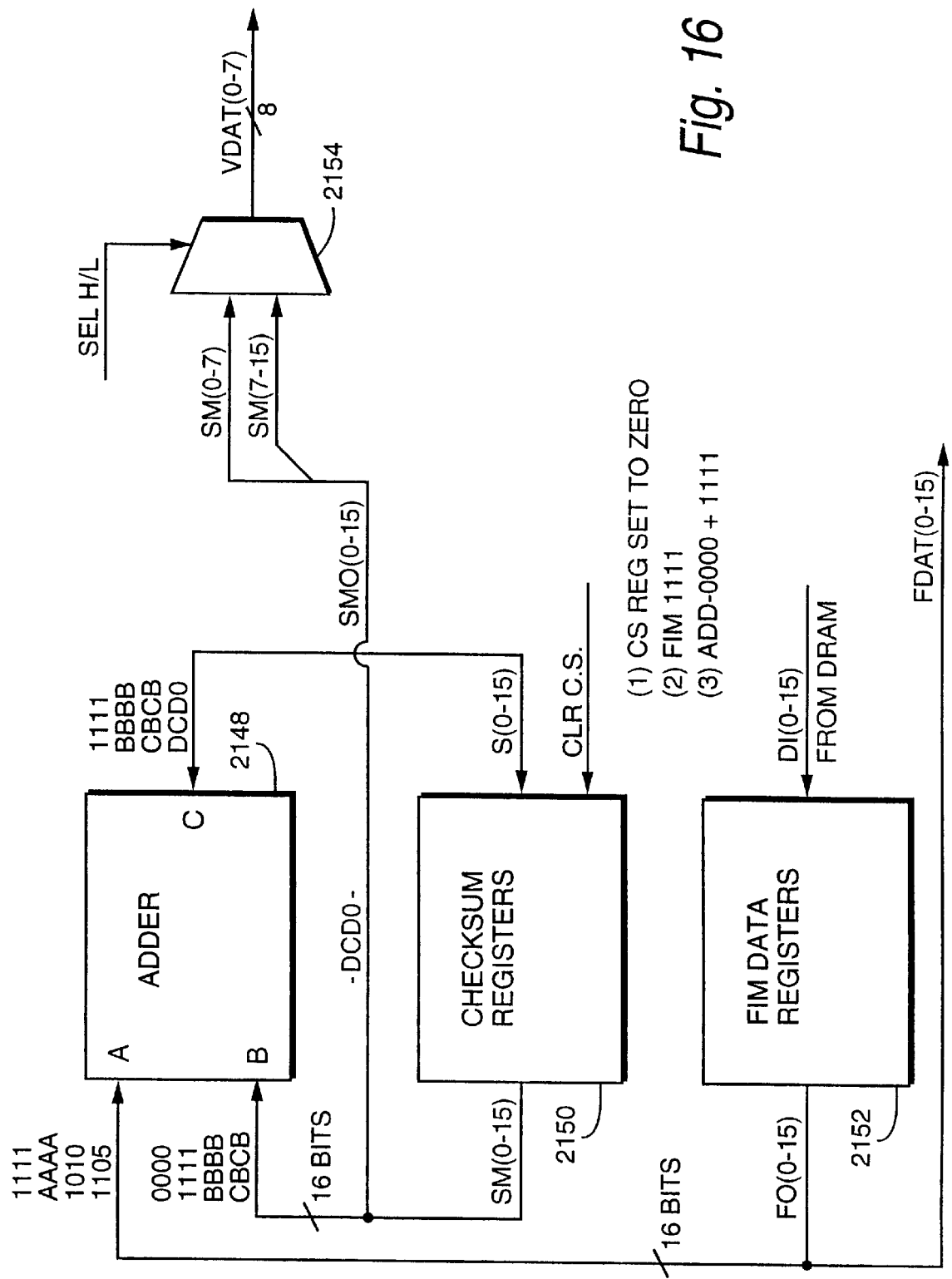
FIG. 16 schematically illustrates a FIM checksum operation which may be implemented by a FIMVME ASIC in accordance with the preferred embodiment of the present invention.

The FIMVME ASIC 2122 also is responsible for calculating FIM checksums. Referring now to FIG. 16, a block diagram useful in describing the checksum operation is shown. Checksums are calculated during production to ensure proper communications are occurring. The checksum calculator includes an adder 2148, checksum registers 2150, FIM data registers 2152, and multiplexer 2154. The checksum registers 2150 are initially cleared and set to zero by the signal CLRCS. FIM data read from FIM DRAM 2146 (FIG. 11) is latched into FIM data registers 2152. The data latched into the FIM data registers 2152 provides one input to the adder 2148. The other input is from the checksum registers 2150.

In operation, the first word of the character information from FIM data registers 2152 is added by adder 2148 to the word stored in the checksum registers 2150. Since the checksum registers 2150 are initially cleared, this has the effect of adding zero to the first word of the character information. The results of the first addition step (i.e., the first word of character information) is then stored in checksum registers 2150. Next, a subsequent word of character information is latched into FIM data registers 2152 and provided to the adder 2148, where it is added to the contents of the checksum registers 2150. This process is continued until the character is completed.

An example checksum calculation is explained with reference to Table I. For purposes of this discussion it is assumed that the character is represented by a total of four words, and it should be noted that all A inputs are selected arbitrarily for demonstrative purposes.

| A | B | C |
|---|---|---|
| 1111 | 0000 | 1111 |
| AAAA | 1111 | BBBB |
| 1010 | BBBB | CBCB |
| 1105 | CBCB | DCD0 |

In the selected example, the four words of character information (in hexadecimal notation) are 1111, AAAA, 1010, and 1105. The first word at adder input A (1111) is added to the contents of the checksum register appearing at adder input B (0000) to produce the sum C (1111). This sum C is then stored in the checksum register 2150 for the next addition step. Following the second addition step (AAAA+1111) the sum C (BBBB) is stored in checksum register 2150; the third addition step (1010+BBBB) causes the sum CBCB to be stored in checksum registers 2150; and the fourth addition step (1105+CBCB) causes the sum DCD0 to be stored in checksum registers 2150. At this point, the checksum value (DCD0) for the character is complete.

Once the checksum value is calculated, a control signal is supplied to multiplexer 2154 to select the high or low byte of the value, which is sent back to the master controller 2110 on the VDAT (0–7) bus to be compared. The checksum is preferably calculated for every character read out of FIM DRAM 2146. The checksum registers 2150 are cleared for the start of calculations for each character.

The SDC main controller 2124 will now be described in greater detail. The SDC main controller 2124 is preferably implemented as an ASIC such as the ACTel A1280 FPGA ASIC discussed above with regard to the FIMVME ASIC 2122. In operation during production, the SDC main controller 2124 receives commands from master controller 2110 to build the print information in BIM. The SDC main controller 2124 uses decoded and control commands to position the pixel map in BIM according to exact X and Y coordinates. Additionally, while building BIM, the SDC main controller 2124 controls the conditions to read BIM and then modify the BIM data and write back to these BIM locations for all available combinational logic formats (e.g., normal, overprint, etc.) while keeping track of which BIM is being addressed at any given input and output cycle.

For each request from the personality module 2114, the SDC main controller 2124 loads output FIFOs 2188 with one raster line of pixel data. Additionally, the SDC main controller 2124 controls writing to FIM, via FIMVME ASIC 2122, during initial download from master controller 2110. If diagnostic capabilities are utilized, the SDC main controller 2124 controls the modes for reading from FIM and reading from BIM.

Figure 17:
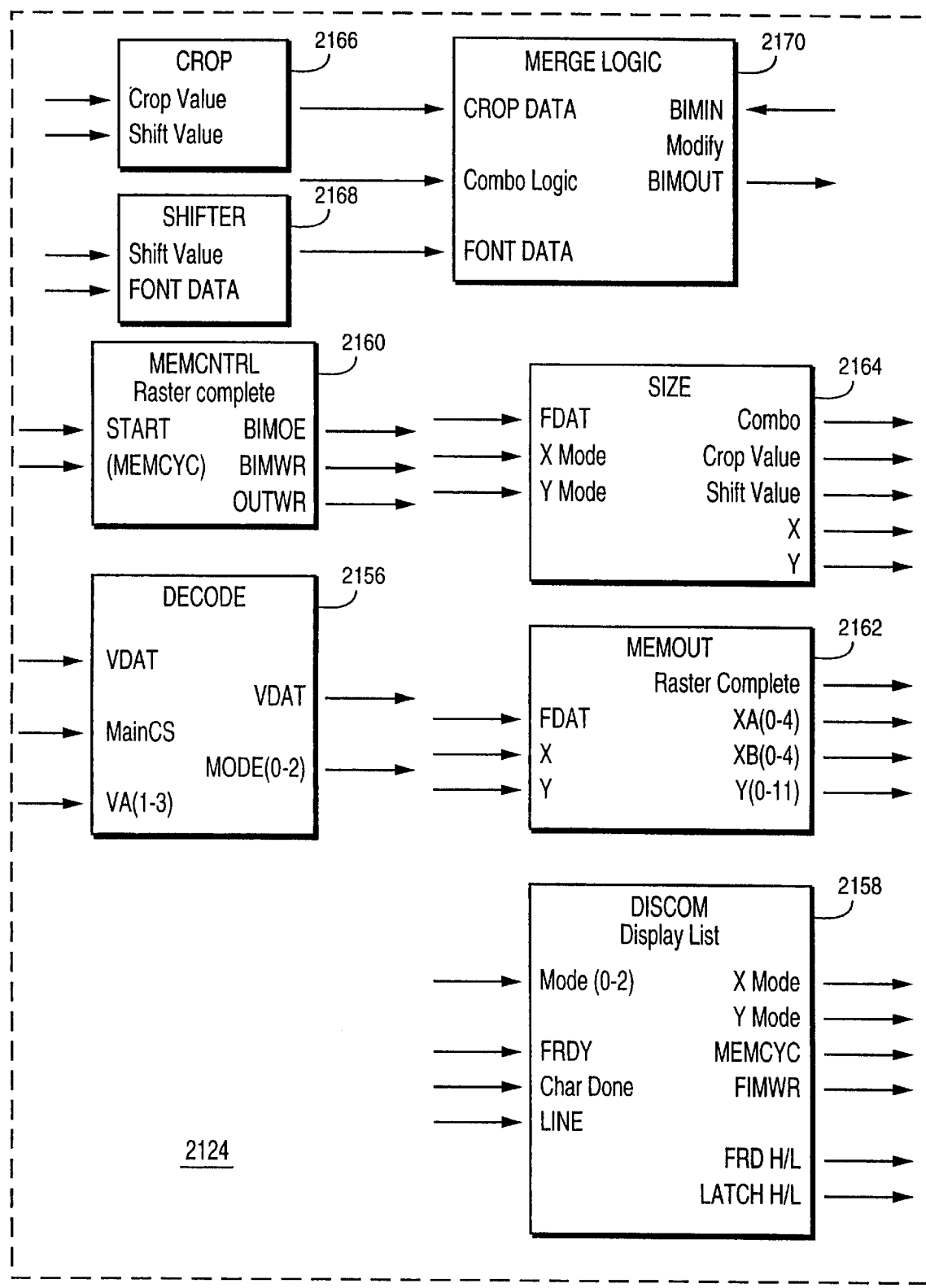
FIG. 17 illustrates an example substructure architecture of a main controller in accordance with the preferred embodiment.
Figure 18:
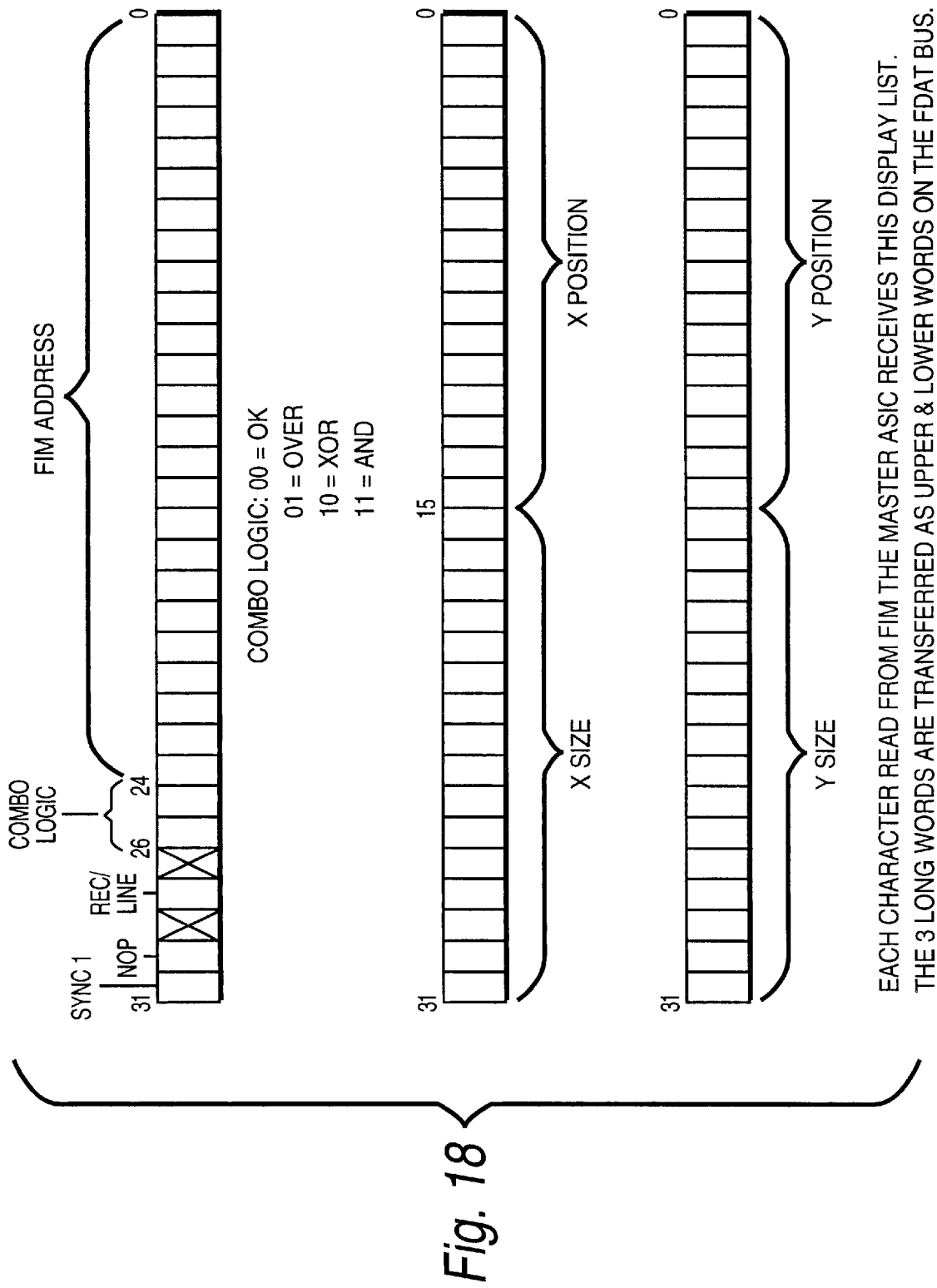
FIG. 18 illustrates an example display list information provided in a set of thirty-two bit longwords.

The general substructure architecture of the SDC main controller 2124 is shown in FIG. 17. The architecture is illustrated in block format as a general illustration of the ASIC technology and structure. As shown, the SDC main controller ASIC 2124 includes a DECODE section 2156, a DISCOM section (Display List) 2158, a MEMCNTRL (memory control) section 2160, a MEMOUT (Memory Out) section 2162, a SIZE section 2164, a CROP section 2166, a SHIFTER section 2168, and MERGE LOGIC section 2170.

The DECODE section 2156 decodes the operating modes when the SDC main controller chip select signal MainCS is active. These modes define exclusively what operation to perform. For example, a O0h received by the DECODE section 2156 on the VA (1–3) input could indicate display list mode; a O3h could designate a write to FIM mode; a O4h could designate a diagnostic FIM read mode; and a O5h could designate an output to BIM mode. The DECODE section 2156 outputs the decoded mode on lines MODE (0–2). Additionally, the DECODE section 2156 determines which BIM is in use, and outputs status to the master controller 2110.

During production, the DISCOM section builds and synchronizes signal timing of the operation mode for the display list. The display list utilizes three longword (i.e., thirty-two bit) "triplets" which define the font address, X size, Y size, Y position, a rectangle/line control and the selected type of combination logic (normal, overprint, reverse or pattern). For example, referring to the display list illustrated in FIG. 18, bits 0–24 of the first display list longword may contain the FIM address, bits 25 and 26 may designate which of the four combinational logic operation is selected, bit 27 is not used, bit 28 is the rectangle/line bit (O=FIM, 1=line), bit 29 is not used, bit 30 is a NOP/IGNORE TRIPLET instruction, and bit 32 is a word adjustment syncronization bit (SYNC1). The second longword may designate the X position with bits 0 through 15 and X size with bits 16 through 31. The third longword may indicated Y position and Y size with bits 0 through 15 and 16 through 31, respectively.

The MEMCTRL (memory control) section 2160 of the SDC main controller 2112 sets up the read/modify/write time using the full clock cycle. This section logically controls the BIM data direction and processes the Output FIFO commands to load the raster data for every data request from the personality module 2114.

The MEMOUT (memory out) section 2162 processes the BIM output cycles. The display list X and Y address coordinates are synchronized for the web direction (up or down) and BIM data. The SIZE section 2164 uses operational mode signals from the DISCOM section 2158 to develop and decode the crop values (i.e., the character width) and X shift position, the X and Y addresses, the line and rectangle bit, and combinational logic bits.

The crop values from the X size bits of the display list (longword 2 bits 16 through 31) is sent to the CROP section 2166 to logically organize a crop mask for absolute width of the character in BIM. The crop mask determines where the character ends in BIM, and keeps other characters from overlapping. The shift value may be viewed as the beginning position of the character, and the crop value indicates the end of the character. The FIM data and the crop values are provided to the MERGE LOGIC section 2170.

The SHIFTER section 2168 is responsible for placing FIM and Line data into BIM using the X and Y coordinates obtained from the display list. The SHIFTER section 2168 and CROP section 2166 interface with the MERGE LOGIC section 2170 to place FIM/Pixel data at specific locations in BIM.

Figure 19:
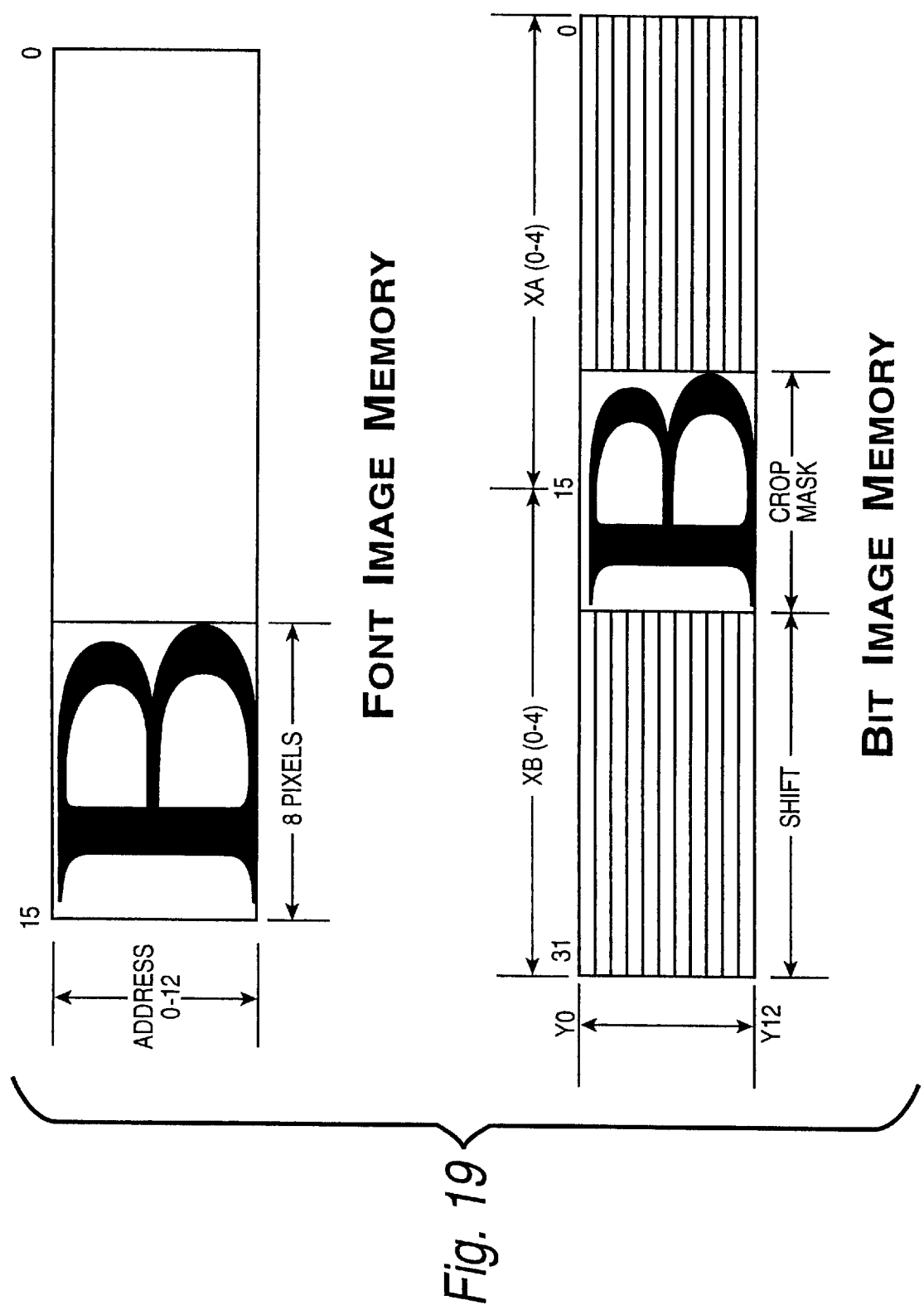
FIG. 19 is an example useful in illustrating a preferred manner in which a character from font image memory (FIM) is placed in bit image memory (BIM)

FIG. 19 illustrates the manner in which a character from FIM is placed in BIM. The character "B" appears in FIM at a location determined by address bits 0 through 12, and is eight pixels wide. The shift and crop values are used to place the character in BIM at a location determined by the X and Y coordinates.

The MERGE LOGIC section 2170 is the final stage for the SDC main controller ASIC 2124, and is responsible for merging the crop, shift, combination logic, line and read/modify/write for all of the display list information built into BIM. The logic preferably includes thirty-two logic cells which read, modify and write to BIM using this information. One such merge logic appears graphically as part of the main controller 2124 in FIG. 20. It should be noted that this is for exemplary purposes only, and additional cells would be included.

Figure 20:
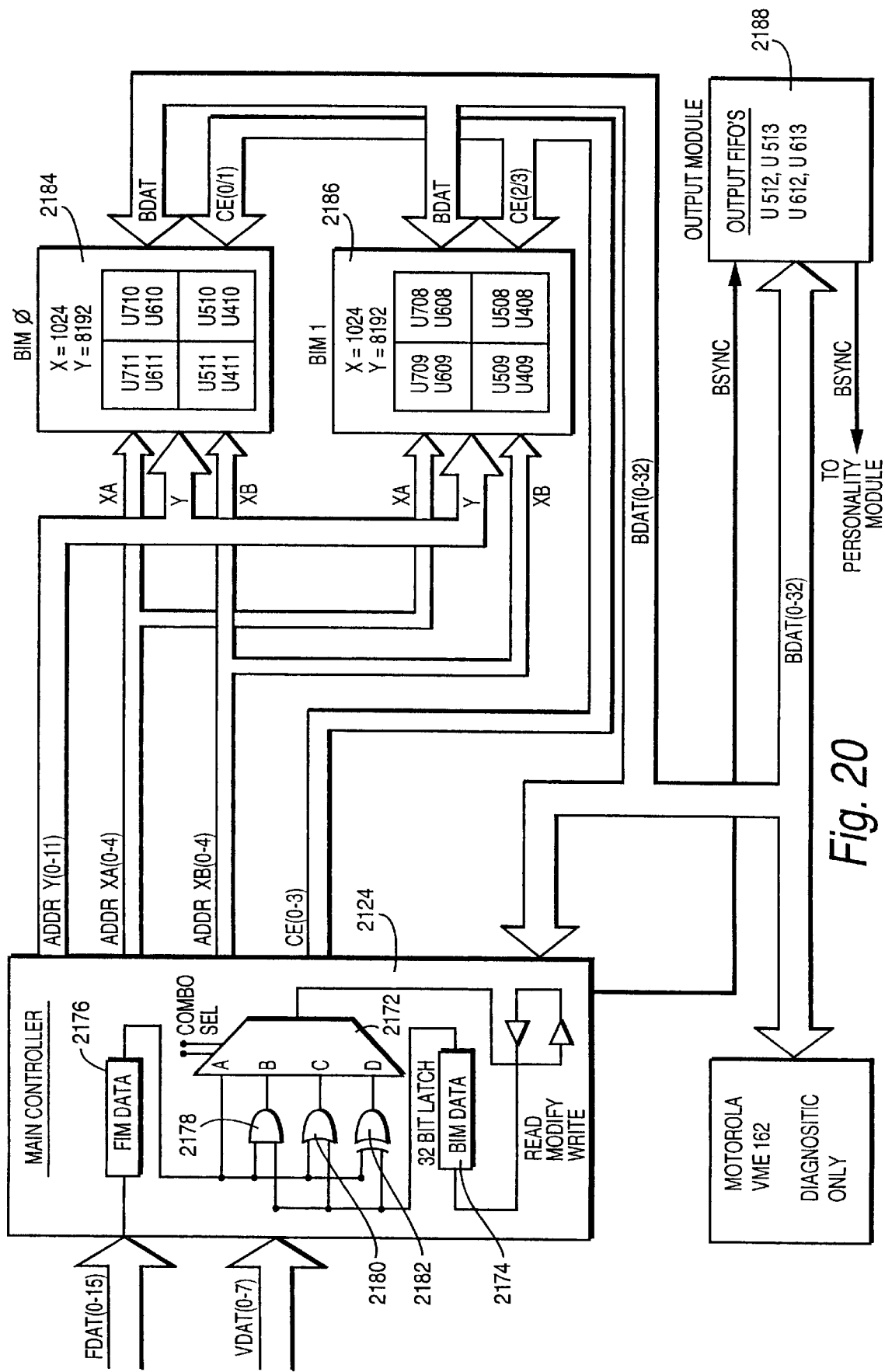
FIG. 20 is an example circuit useful in illustrating operation of a main controller in accordance with the present invention.

In the exemplary circuit of FIG. 20, the MERGE LOGIC includes a four input multiplexer 2172 which operates under control of the combination logic select bits from the first longword, (i.e., bits 25 and 26). BIM data on the BDAT (0–32) bus and FIM data on the FDAT (0–15) bus are latched into a BIM data latch 2174 and a FIM data latch 2176, respectively. The FIM data is then provided to input terminal A of the multiplexer 2172 and to input terminals of AND date 2178, OR gate 2180 and XOR 2182. The other inputs to the AND gate 2178, the OR gate 2180 and XOR gate 2182 come from the BIM data latch 2174. The output of AND gate 2178 is input B to multiplexer 2172; the output of OR gate 2180 is input C to multiplexer 2182 and the output of XOR gate 2182 is input D to multiplexer 2172.

Depending on the particular values of the combination logic bits, one of the signals appearing at the input terminals A–D of the multiplexer 2172 will be passed to the output. The output of multiplexer 2172 is then placed back on the BDAT bus through a line driver circuit.

As shown in FIG. 20, the BIM may be viewed as two different BIMs, BIMO 2184 and BIMI 2186. In operation, while one BIM is being built by the main controller 2124, the other is being read by the personality module 2114. Each BIM boundary is XA (0–4) and XB (0–4)=32 bytes×4 (1024 pixels) wide and Y (0–11)=4096×2 (8192 pixels) deep. In terms of maximum imaging area, a maximum of sixteen bars and a form size of 27.3 inches can be placed in this exemplary BIM. It is possible to construct the BIM memory areas from one large memory divided into separate areas, or to utilize multiple memory ships. Preferably, BIM is comprised of sixteen 128k ×8 static RAM chips.

The registration controller may use a commercially available Micro Controller 87C52. The master controller 2110 writes VDAT (0–7) to FIMVME ASIC 2122 which, in turn, sets up RS232 serialized data to a *WRREG (write register) line to an RXD input of the Micro Controller (see VMEDEC section of FIMVME ASIC 2122 in FIG. 12). In this way, form size and resolution are written to the controller.

A more detailed explanation of the personality module 2114 will now be provided. The description here will use an example based on the use of a MICA print engine. It should be appreciated, however, that other print engines could be utilized, in which case the personality module would be suitably modified. To adapt a scaled down raster image processor to a different print engine, one need only replace the personality module with one intended for the different print engine.

The personality module 2114 is responsible for requesting and reading raster data from the scaled down controller 2112 output FIFOs 2188 (FIG. 20) to build up staging RAM. In the preferred implementation of the MICA personality module, two EEPROMs with the coarse bar offsets are used to control each bar read according to position and distance from each other. In the arrangement of FIGS. 8A and 8B, six mounting brackets are provided. Thus, five bar offset values are needed to accommodate the relative displacement of the print cartridges.

The pixel data is then sent to the service station through four sixteen word transfers along with the bar address. The five offsets were previously keyed in from the Q-term data display terminal 66 according to bar number and offset value, and are stored in the personality module EEPROMs for access in the offset mode. The interface between the Q-Term keypad 66a and display functions are transceived by an RS232 chip and handled by a PIC 17C42 microcontroller. During production, the master controller 2110 sends Q-term display messages while polling the PIC microcontroller for service station status and mode changes from the Q-Term terminal. For the MICA personality module, the PIC microcontroller manages operation and sends mode and GPI message codes to the master controller 2110. The PIC microcontroller also sends the five offset values to a personality module controller ASIC to adjust positioning of the print data.

As illustrated in FIG. 9, the personality module 2114 includes an SDC interface section 2189 and a PM control ASCI 2190. The SDC interface 2189 preferably utilizes a 96 pin DIN connector to interface bus, control and data signals between the scaled down controller 2112 and the personality module 2114. A CA (0–9) bus provides the decode address of the personality module control ASIC as well as control signals for initiating print cycles. These signals are preferably buffered by a pair of transceivers. A data request signal DREQ is active when the master controller 2110 sends a start print command on the VDAT (0–7) bus and is decoded by the PM control ASIC 2190. The data request signal DREQ initiates the scaled down controller 2112 to send a complete raster load to the output FIFOs 2188 (see FIG. 20). The OEMTY line is checked by the PM controller ASIC 2190 to determine when it is active. If it is active, data is available. The PM control ASIC 2190 then issues a PDATRD signal to read the contents of the output FIFOs 2188 to build staging RAM.

Figure 21:
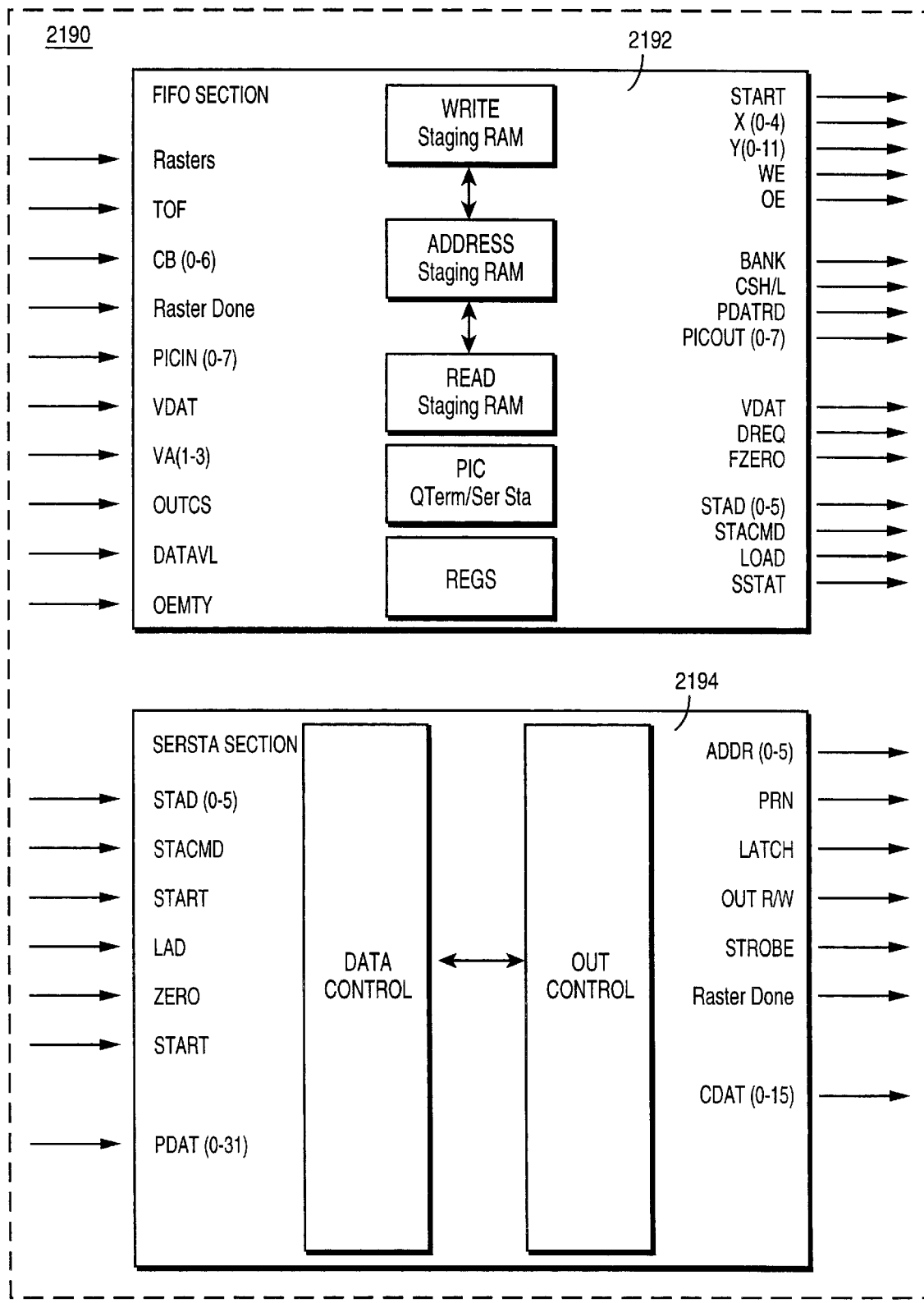
FIG. 21 shows an example substructure architecture of the personality module ASIC.

FIG. 21 illustrates an example substructure of a personality module control ASIC 2190 which may be used in accordance with the present invention. As shown, the PM control module 2190 includes FIFO section 2192 and a service station operation section 2194. The PM control ASIC 2190 provides large component integration using ASIC technology to decode and control protocol of the personality module 2114 between the master controller 21 10 and the service station. The structure of the PM control ASIC performs data transfer, control, messages and status operations. The PM control ASIC 2190 supervises the Q-Term data terminal 66 and the service station while it directs pixel data to and from staging RAM and out to the service station.

The pixel data on PDAT is written to staging RAM in a manner similar to which it was written to BIM. On the read cycle, offsets are added and data is transferred to the service station one word at a time. In the preferred embodiment, when bar pixel data is loaded into staging RAM, typically all the bars have the same base address.

Figure 22:
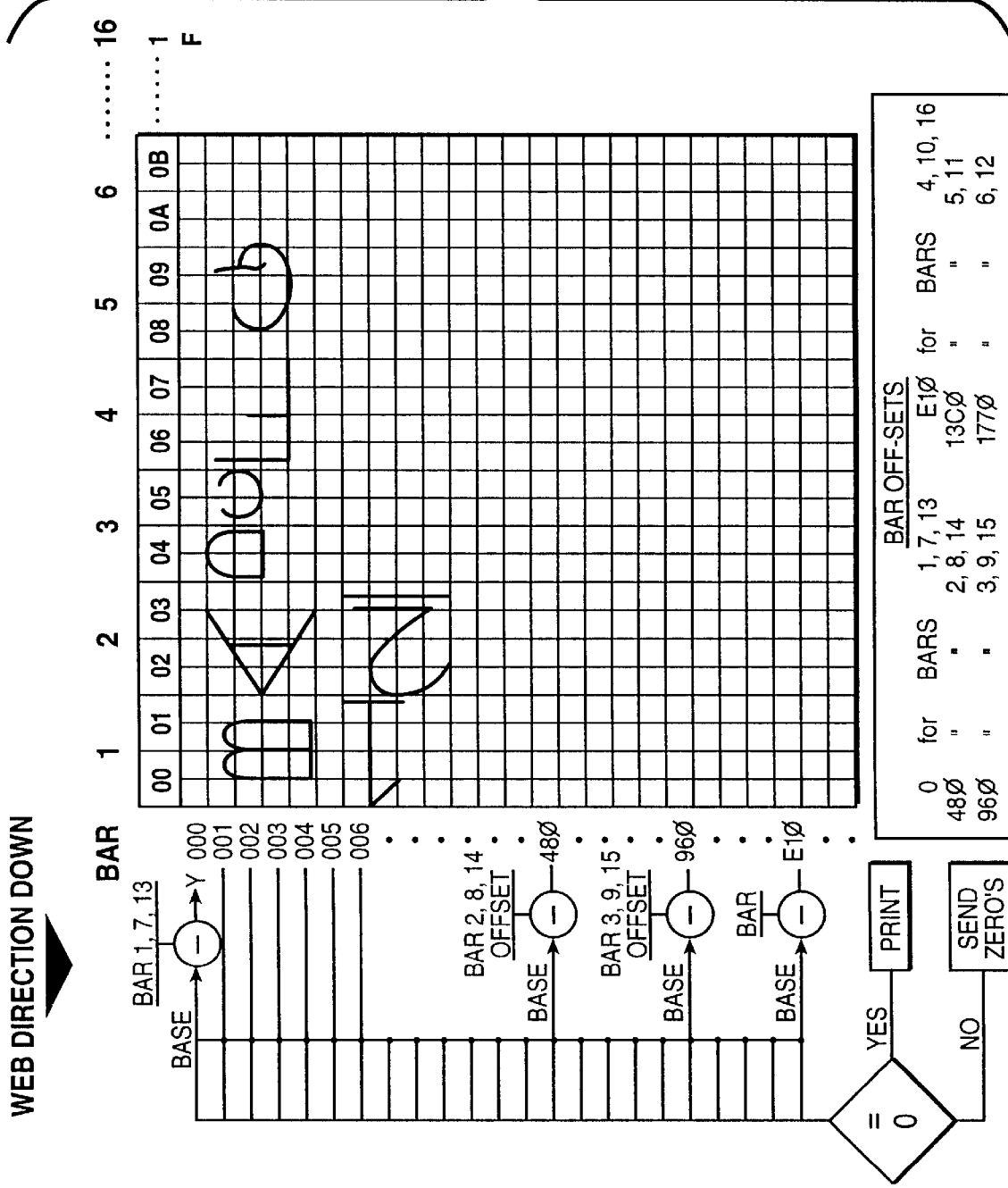
FIG. 22 illustrates a technique for compensating for relative displacements of print cartridges in the direction of web movement.

As can be seen in FIG. 8, the same print bars are displaced relative to others in the direction of web movement (i.e., the "Y" direction). More particularly, if the web movement is in the downward direction, the print location on the web will pass print cartridges C1, C7 and C13 prior to passing print cartridges C2, C8 and C14, etcetera. Since in the preferred embodiment all the bars have the same base address in the staging RAM, it is necessary to account for the relative displacement between the bars. One technique for doing so is illustrated in FIG. 22. When the PIC microcontroller sends the offset values to the PM control ASIC 2190, the address is added to an offset value for the respective bars. As a result of the addition, the data sent to the service station will be either the print data or, until the offset value is reached, all zeroes. Referring to FIG. 22, print cartridges mounted on a common bracket (e.g. (C2, C8, C14) or (C3, C9, C15)) are assigned approximately the same coarse offset value. In this way, bar data need not be staggered and stored in the staging RAM with an offset.

The PM control ASIC 2190 checks to ensure that transfer of an entire raster line is completed before a raster clock is finished. Three print errors are checked: (1) if another raster pulse comes in before the raster transfer is complete, an internal "raster not done" error signal is generated; (2) the OEMTY bit from the output FIFOs is checked, if it goes active the FIFOs went empty and an error is generated; and (3) if a DATAVL line from the service station does not toggle between two raster pulses, a print device error is generated.

All error signals from the PM control ASIC 2190 are sent back to master controller 2110 on the VDAT (0–7) bus. The master controller 2110 polls the PM control ASIC 2190 status register to determine whether an error bit is set. If it is, the master controller 2110 checks the error in the error register and sends it back to the XL data system 62. The error is also displayed at the data terminal 66.

The CA bus has been decoded by the FIMVME ASIC 2122 to select the PM control ASIC 2190 with chip select signal OUTCS and an absolute internal address VA (1–3) while a VWR signal enables three state buffers for the VDAT (0–7) bus as an input or output cycle. A top of form (TOF) signal clears the internal registers in the PM control ASIC 2190 prior to starting a print signal to allow the proper print cycle to be set up and initiated. The RASTERS signal in FIG. 21 is ordinarily the print clock.

The CB (0–6) lines carry status bits for the PIC microcontroller. The master controller 2110 polls the status register in the PM control ASIC 2190. If any status bit is set, the master controller reads the VDAT (0–7) bus for the status. The ADDR (0–5) bus provides bar select numbers 1–16 for the service station.

The signals PRN, LATCH, OUT R/W and STROBE are provided to the service station by the service station interface of PM control ASIC 2190. Internal logic generates these signals in synchronization with the start and read cycles. PRN initiates a print cycle at the service station. STROBE and OUT R/W enable the bar data loading sequence at service station data latches. The LATCH line is a handshaking signal to continue printing. The LATCH signal develops the DATAVL signal on each 16 word data transfer.

During a write cycle, the PM control ASIC 2190 sends out 16 bits of pixel data to the service station over the CDAT (0–15) bus. For a read cycle, the PM control ASIC 2190 receives the lower 8 bits from the CDAT (0–15) bus as print engine status from the service station and routes it to the PIC microcontroller on the PIC bus.

The X (0–4) bus carries the address width of the staging RAM. The Y (0–11) bus carries the address height of the staging RAM. The staging RAM preferably consists of eight 128k×8 Static RAM chips arranged in a circular configuration.

The write enable signal WE, the output enable signal OE, the BANK selection bit, and the chip select word high and word low signals CSH and CSL are used in accessing the staging RAM. The chip select signals CSH and CSL may be enabled at all times. The staging RAM is continuous with the BANK selection bit, which is always reset when one section of RAM has been read completely.

The PM control ASIC 2190 receives on the PIC BUS (0–7) bar offset values for addressing, information keyed by the Q-Term data terminal 66, and PIC messages to the master controller 2110. The master controller 2110 writes information concerning web direction, resolution and display to the PIC microcontroller on the PIC BUS.

Pixel data is loaded into the staging RAM from the output FIFOs 2188 through thirty-two bit transfers. The PM control ASIC 2190 reads in thirty-two bits and outputs the low word of the bar data, followed by the high word, to the service station. The read cycle consists of sixteen odd longword reads from the staging RAM followed by thirty-two word transfers to the service station for each bar, then the sixteen even longwords followed by thirty-two word transfers to complete all bar data for one raster cycle.

The personality module 2114 includes a Q-term data terminal interface section which combines the PIC microcontroller, the two EEPROMs and an RS232 interface for the Q-term data terminal 66 with address/data and control buses. The PIC microcontroller sends offsets (coarse and fine), messages and key entries from the Q-term data terminal 66 to the master controller 2110 via the PM control ASIC 2190 over the PIC BUS. The PIC microcontroller receives display information, web direction and resolution from the master controller 2110 via the PM control ASIC 2190, and outputs that information to the Q-term data terminal 66.

The final section of the personality module is an I/O module. This section includes signal line drivers and receivers which may be tied to a sixty-eight pin SCSI-2 connector.

The SCSI-2 connector provides the cable connection to the print engine service station.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A scaled down raster image processor for reduced cost, reduced complexity processing of print image data to be printed on a particular print engine, said scaled down raster image processor comprising:

a master controller circuit which receives a job description file and, in response to said job description file, prepares displays lists and transfers fonts for storage in a font image memory;

a scaled down controller circuit that operates in accordance with display lists received from said master controller circuit and said stored fonts to generate a digital representation of an image;

a bit image memory associated with said scaled down control circuit, wherein said bit image memory stores the digital image representation generated by said scaled down controller; and a personality module for said particular print engine, said personality module operable to request and read raster data from said bit image memory and to provide said raster data to said print engine to operate said print engine and thereby produce an image.

2. The scaled down raster image processor of claim 1, wherein said personality module receives pixel data from said scaled down control circuit and directs the pixel data to a staging memory.

3. The scaled down raster image processor of claim 2, wherein said personality module is connected to a print engine which prints on a moving web, and wherein said personality module is connected to sense movement of said moving web and synchronizes the output of pixel data from said staging memory to said print engine with movement of said web.

4. The scaled down raster image processor of claim 3, wherein said print engine has a plurality of printing mechanisms arranged in an array to print a corresponding plurality of print bars, at least two of the printing mechanisms being displaced relative to one another in the direction of web movement, and wherein said personality module loads data for the individual print bars in said staging memory with the same base address.

5. The scaled down raster image processor of claim 4, wherein said personality module receives offset values for the individual print bars and wherein said personality module adds the offset values to the staging memory address for the respective bar print data prior to outputting pixel data from said staging memory to said print engine.

6. The scaled down raster image processor of claim 5, wherein said print engine includes a plurality of ink jet cartridges arranged on a series of adjacent mounting brackets.

7. The scaled down raster image processor of claim 5, wherein said offset values are adjustable by an operator through a data terminal which interfaces with said personality module.

8. The scaled down raster image processor of claim 1, wherein said first control circuit writes font data to an input first-in, first-out memory, and wherein said scaled down controller includes a first application specific integrated circuit (ASIC) which transfers the font data from said first-in, first-out memory to said font image memory.

9. The scaled down raster image processor of claim 8, wherein said scaled down controller further includes a second ASIC which operates in response to said display list to generate said digital image representation and store it in said bit image memory.

10. The scaled down raster image processor of claim 9, wherein said bit image memory includes a first memory area and a second memory area, whereby said personality module may read data from one memory area while said second ASIC stores an image in the other memory area.

11. The scaled down raster image processor of claim 9, wherein said second ASIC of said scaled down controller includes a crop section which organizes a crop mask for absolute width of a character stored in said bit image memory.

12. The scaled down raster image processor of claim 11, wherein said second ASIC of said scaled down controller further includes a shifter section which places character data in said bit image memory according to coordinate information from said display list.

13. The scaled down raster image processor of claim 12, wherein said second ASIC of said scaled down controller includes a merge logic section which merges information from said crop section and said shifter section for display list data stored in said bit image memory.

14. The scaled down raster image processor of claim 13, wherein said merge logic section includes combinational logic which operates in response to information in said display list to produce a selected print mode.

15. The scaled down raster image processor of claim 14, wherein said selected print mode is one of normal mode, overprint mode, reverse mode, and pattern mode.

16. The scaled down controller of claim 9, wherein said first ASIC of said scaled down controller decodes address signals from said first control circuit and, in response to the decoded signals, provides enable signals for one of said first ASIC, said second ASIC and said personality module.

17. A method of providing print information to a print engine that prints on a moving web and has a plurality of printer mechanisms for printing a plurality of adjacent print bars, wherein at least two of said printer mechanisms are displaced relative to one another in the direction of web movement, comprising the steps of:

forming a display list specifying an image;

storing font information in a font image memory;

generating a digital representation of an image based on said display list and said stored font data, and storing said digital image representation in a bit image memory;

reading raster data from said bit image memory and directing pixel data to a staging memory, data for each print bar having the same base address;

for each print bar, adding an offset value to said base address for said print bar data; and providing offset print bar data to said print engine in synchronism with web movement.

18. The method of claim 17, comprising the additional preliminary step of setting said offset values with an operator controlled data terminal.

19. The method of claim 18, wherein both coarse and fine offset values may be adjusted.

* * * * *